(12) United States Patent
Graff et al.

(10) Patent No.: US 9,298,844 B2
(45) Date of Patent: Mar. 29, 2016

(54) SYSTEM AND METHOD FOR OPTIMIZING MOBILE DEVICE COMMUNICATIONS

(71) Applicant: Parlant Technology, Inc., Provo, UT (US)

(72) Inventors: John Graff, Provo, UT (US); Bruce Hassler, Mapleton, UT (US); Jacob Hutchings, Provo, UT (US)

(73) Assignee: Parlant Technology, Inc., Provo, UT (US)

( * ) Notice: Subject to any disclaimer, the term of this patent is extended or adjusted under 35 U.S.C. 154(b) by 0 days.

(21) Appl. No.: 14/152,229

(22) Filed: Jan. 10, 2014

(65) Prior Publication Data

US 2014/0164909 A1 Jun. 12, 2014

Related U.S. Application Data

(63) Continuation-in-part of application No. 14/019,068, filed on Oct. 4, 2013, which is a continuation-in-part of application No. 13/709,293, filed on Dec. 10, 2012, application No. 14/152,229, which is a (Continued)

(51) Int. Cl.
*G06F 17/00* (2006.01)
*G06F 17/30* (2006.01)
(Continued)

(52) U.S. Cl.
CPC ........ *G06F 17/30899* (2013.01); *G06F 15/167* (2013.01); *G06F 17/30905* (2013.01);
(Continued)

(58) Field of Classification Search
CPC ............ G06F 17/30899; G06F 15/167; G06F 17/3887; G06F 17/30905; G06Q 10/107; G06Q 10/10; G06Q 30/02; G04L 41/026; G04L 65/4023; H04L 65/026; H04L 12/58; H04W 4/12

USPC .......... 715/208, 202–205, 752, 227; 342/357.31, 457; 455/414
See application file for complete search history.

(56) References Cited

U.S. PATENT DOCUMENTS 7,908,602 B2  3/2011  Alcorn et al.
2012/0302222 A1*  11/2012  Williamson .......... H04W 4/001
                                           455/418

(Continued)

FOREIGN PATENT DOCUMENTS

DE          2651097 A1   10/2013

OTHER PUBLICATIONS

Stackoverflow.com, Check if URL scheme is supported in javascript, available at http://stackoverflow.com/questions/627916/check-if-url-scheme-is-supported-in-javascript (last checked on Jan. 10, 2014).

*Primary Examiner* — Quoc A Tran
(74) *Attorney, Agent, or Firm* — Wright Law Group, PLLC; Mark F. Wright

(57) ABSTRACT

A system and method for optimizing mobile communications with one or more message recipients is disclosed. The system is configured to create a unique URL and send it to a message recipient via an appropriate communication platform. The system waits for the unique URL to be requested and logs information from the web browser associated with the mobile communication device used to access the unique URL. The system may use this information to direct the mobile device user to a dynamically created web page. This methodology can be used to improve immediate and future communications by tailoring the message content and communication platform according to the message recipient's mobile device. The dynamic web page may also be configured to prompt the message recipient to execute a desired action, including downloading a compatible mobile app and changing message delivery preferences in order to optimize communications with the message recipient.

16 Claims, 11 Drawing Sheets

Related U.S. Application Data continuation-in-part of application No. 14/019,029, filed on Sep. 5, 2013, which is a continuation-in-part of application No. 13/709,293, filed on Dec. 10, 2012, application No. 14/152,229, which is a continuation-in-part of application No. 13/924,372, filed on Jun. 21, 2013.

(51) Int. Cl.
| | |
|---|---|
| *G06Q 10/10* | (2012.01) |
| *G06Q 30/02* | (2012.01) |
| *H04W 4/12* | (2009.01) |
| *H04L 12/58* | (2006.01) |
| *G06F 15/167* | (2006.01) |

(52) U.S. Cl.
CPC .............. *G06Q10/10* (2013.01); *G06Q 10/107* (2013.01); *G06Q 30/02* (2013.01); *H04L 12/58* (2013.01); *H04W 4/12* (2013.01)

(56) References Cited

U.S. PATENT DOCUMENTS

| | | | |
|---|---|---|---|
| 2012/0303834 A1* | 11/2012 | Adam et al. .................. 709/231 |
| 2013/0041913 A1* | 2/2013 | Durvasula et al. ............ 707/769 |
| 2013/0122861 A1 | 5/2013 | Kim et al. |
| 2013/0124606 A1* | 5/2013 | Carpenter et al. ............ 709/203 |
| 2014/0006517 A1* | 1/2014 | Hsiao .................... G06Q 50/01 709/205 |
| 2014/0129942 A1* | 5/2014 | Rathod ........................ 715/720 |

\* cited by examiner

700

| | Priority | Enabled | Device | OS |
|---|---|---|---|---|
| MESSAGE RECIPIENT 1 Device Profile | 1 | X | Cell Phone (number) | iOS 6 |
| | 2 | X | Tablet | Android 2.3 |
| Conflict Priority 1 | 3 | X | Pager (number) | N/A |
| | X | ☐ | | |
| | unique URL | | | |
| MESSAGE RECIPIENT 2 Device Profile | 1 | X | Tablet | iOS 6 |
| | 2 | X | Cell Phone (number) | iOS 6 |
| Conflict Priority 2 | 3 | ☐ | Cell Phone (number) | Windows |
| | ☐ | ☐ | | |
| | unique URL | | | |

FIG. 7

SYSTEM AND METHOD FOR OPTIMIZING MOBILE DEVICE COMMUNICATIONS

CROSS REFERENCE TO RELATED APPLICATIONS

This application is a continuation-in-part of U.S. patent application Ser. No. 14/019,068, which application was filed on Oct. 4, 2013, which application is now pending, and which application is incorporated herein by reference. U.S. patent application Ser. No. 14/019,068 is a continuation-in-part of U.S. patent application Ser. No. 13/709,293 which application was filed on Dec. 10, 2012, which application is now pending and which application is incorporated herein by reference.

This patent application is a continuation-in-part of U.S. patent application Ser. No. 14/019,029, which application was filed on Sep. 5, 2013, which application is now pending and which application is incorporated herein by reference. U.S. patent application Ser. No. 14/019,029 is a continuation-in-part of U.S. patent application Ser. No. 13/709,293 which application was filed on Dec. 10, 2012, which application is now pending and which application is incorporated herein by reference.

This application is a continuation-in-part of U.S. patent application Ser. No. 13/924,372, which application was filed on Jun. 21, 2013, which application is now pending, and which application is incorporated herein by reference.

BACKGROUND OF THE INVENTION

1. Technical Field

The present invention relates generally to the field of interactive communication and specifically related to a system and method of gathering information from a mobile device in order to optimize the content and delivery of one or more messages for a message recipient.

2. Background Art

Many schools, businesses, government agencies, and other organizations find it valuable to foster quality communication with their constituencies. This process increasingly involves the delivery of highly customizable and individually tailored messages via multiple communication platforms including email and social networking applications. The use of mobile communication devices for disseminating information is also increasing. Information about the intended message recipient's mobile device can be helpful when creating customized messages and also in creating or choosing the channel of communication used to deliver the messages.

Many organizations have a preferred channel for communicating with their audience. The selection of the communication platform or medium may be based on, among other factors, the differences in speed, cost, flexibility, reliability, or convenience for the individual or organization. As technology progresses and the costs associated with messaging decreases, more individuals have and are using smartphones, tablets or other mobile communication devices for sending and receiving messages. Accordingly, mobile communication channels are becoming an increasingly important method for reaching out to people, and may be the primary form of receiving information for many individuals. For example, mobile applications or "apps" are becoming ubiquitous and many individuals will download the latest apps in order to enhance their mobile communication experience. In addition, mobile device apps are becoming more robust, easier to use, and less expensive to produce on an almost daily basis.

Given the rapid growth in functionality and adoption of mobile apps in the last few years, many organizations are now choosing to integrate mobile apps into their communication outreach programs. Further, many other organizations now prefer or would potentially prefer to use mobile apps to communicate with as many of their constituents as possible. For example, since communication by telephone and text messaging can be expensive, many schools try to limit the amount of text messages and telephone calls made by the school due to the high costs associated with the infrastructure and third party services needed. On the other hand, a mobile app with a push notification feature is generally a less expensive option for easily and reliably delivering personalized communications to parents, students, teachers, and administrators.

While mobile apps offer great promise for providing an enhanced communication experience, organizations deploying a mobile app still rely on their constituents adopting the mobile app in order for the organization to reap the intended benefits. Driving adoption of the app in significant numbers can be difficult to achieve for a number of reasons. First, the organization needs to inform the constituents about the availability of the mobile app and otherwise encourage or incentivize them to download and install it on their mobile device. However, notification regarding the availability of the app is not enough. Since mobile apps are only compatible with the specific hardware and operating systems the app was designed for, significant effort may be wasted because some constituents may not have a mobile device that is compatible with the app.

Accordingly, since most organizations will likely have constituents that use a wide variety of mobile devices and operating systems, not all of which will be compatible with a given mobile app, the organization and its constituents may be frustrated in their attempts to create and deploy apps that will have broad acceptance. While it can be difficult to for a company to know the compatibility of each constituent's mobile device with a given app, it would be useful to understand which mobile communication devices and operating systems are being used in order to enhance the probability that as many constituents as possible can effectively and efficiently use the mobile app. Further, if the constituents have not downloaded an available mobile app to their mobile communication device, it will generally impede the optimization of communication and likely increase communication costs for the organization. Accordingly, without improvements in the process of driving adoption of mobile apps, the dissemination or messages via mobile communication devices will continue to be suboptimal.

BRIEF SUMMARY OF THE INVENTION

A computer-based system is configured to allow for the gathering of information from the mobile communication devices of message recipients. The system receives and stores information from specific message recipients allowing for tailoring individualized and dynamic messaging for each message recipient and their mobile communication device. The system creates and sends a message containing a unique URL to each of the contact addresses associated with an intended message recipient. Each intended message recipient will receive a different unique URL and when the intended message recipient accesses the unique URL, a device profile for the device that accesses the unique URL may be captured and stored. Once captured, the device profile will be stored in a database along with a profile for the message recipient and also associated with the specific device that accessed the unique URL for that message recipient. This information may then be used to optimize future messages sent to that message recipient.

In at least some preferred embodiments of the present invention, the unique URL references a web page that will dynamically route the web browser to a specific webpage based on the results of the queries logged by the web server at the time the unique URL is accessed by the message recipient. This function may be used to create dynamic messages based on the location of the message recipient or the time that the request to access the unique URL is received from the mobile app. Due to the unique nature of the URL, it can also be used to deliver a highly targeted message specifically created for a single message recipient.

In at least some preferred embodiments of the present invention, when the unique URL is accessed, the message recipient will be directed to a download page for a mobile app and incentivized to download and install the mobile app. In order to ensure compatibility to the extent practical, the specific version of the app that the message recipient is directed to download will be based on the specific hardware and related operating system of the message recipient's device. In some of these embodiments, the mobile app would use the unique URL used to download the app to make the process of logging into a profile account in the app faster and easier.

Other preferred embodiments of the present invention allow access to some features that would normally require login, but may also require a login or other authentication process in order for the user of the mobile communication device to access all of the features of the mobile app. This is because the unique URL allows the device to be associated with a known message recipient profile or person already associated with the user or organization using the system.

Some preferred embodiments of the present invention may be configured to work in tandem with a mobile app, and, in at least some of these embodiments, the mobile app requires a message recipient profile login to access the mobile app's services. The system is configured to connect to the web server of the mobile app, whether that is the same as the one used for the mobile web site or a different one. The web server stores what message recipient profiles log into the app, and stores that data in the database or set of databases that store the message recipients contact information. This allows for convenient cross-referencing between the two lists for implementing various functions of the present invention.

Many organizations could utilize current information to create dynamic messages for improved communication with individual or groups of message recipients. Having a system and method of both informing the constituents of the mobile app and to identify what web browser and operating system were used by each of the constituents would be of use to the organizations. It could help them focus their efforts in encouraging the correct people to download their mobile app, and specifying the correct version for their given device's operating system. It would be even more useful if this prompting were immediate and automatic.

It is also helpful to know how many of their constituents have mobile devices compatible with each type of mobile app because the organization can use this knowledge to better plan future development of mobile apps for different operating systems of mobile devices. While useful for many environments, the most preferred embodiments of the present invention are adapted for use in an educational environment to provide school administrators, teachers, parents, and students with enhanced communication capabilities.

BRIEF DESCRIPTION OF THE FIGURES

The preferred embodiments of the present invention will hereinafter be described in conjunction with the appended drawings, wherein like designations denote like elements:

FIG. 7 is a schematic representation of a database record for message recipient and mobile device profiles used by the system in accordance with a preferred exemplary embodiment of the present invention;

DETAILED DESCRIPTION OF THE INVENTION

Figure 1:
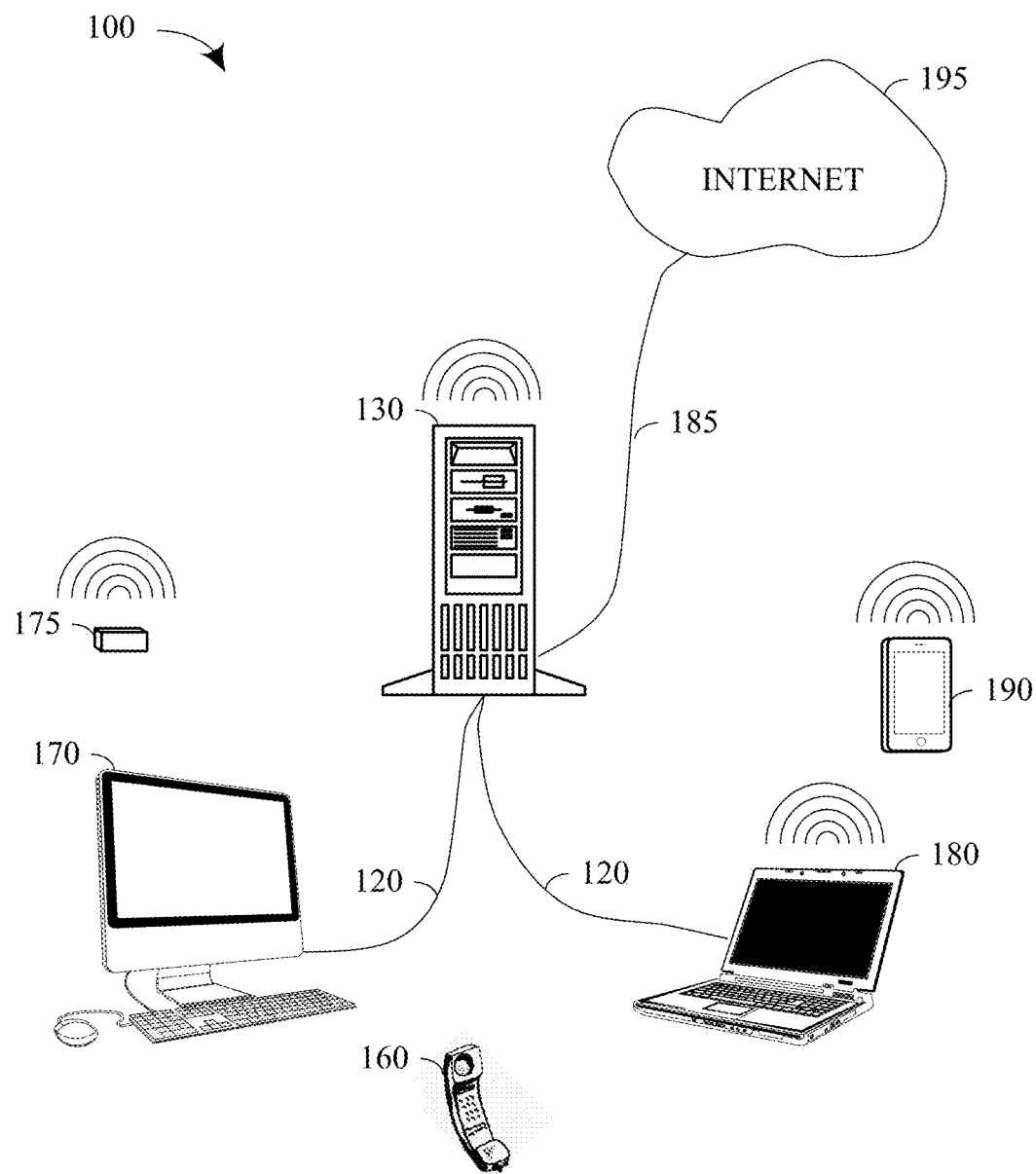
FIG. 1 is a schematic diagram of a computer-based system for gathering information about message recipient mobile devices in accordance with a preferred exemplary embodiment of the present invention.

A system and method for optimizing mobile communications with one or more message recipients is disclosed. The system is configured to allow use in a multi-user, a multi-organizational environment. The system provides for a means of identifying system parameters of message recipient's devices. A personal message is created for each message recipient with a unique URL, prompting the message recipient to access the unique URL via a mobile device if possible. When the mobile communication device connects with the web server, the web server may query the mobile communication device for various types of information. Some of this information can be used to determine where to reroute the message recipient. It can also be used to optimize future communications. The information can also be used to prompt the message recipient to perform a desired action such as download a mobile app or change message delivery preferences.

Aspects of the present invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in or on a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Additionally, various preferred embodiments of the program product may be configured to: create and modify multiple databases; track, update and store data related to the gathering of information from message recipients; update and transmit message to one or more message recipients; configure and implement various search and retrieve functions for a multitude of search requests and determinations made by users of the computer-based system for identifying smart phones; and provide one or more user interfaces for accomplishing all of these functions.

In this fashion, the appropriate entities (i.e., business owners, managers, administrators, teachers, parents, students, etc.) can utilize the program product to initiate and complete a wide variety of database-related applications for the provision of gathering information about message recipients. Similarly, a program product in accordance with one or more preferred embodiments of the present invention can also be configured to perform substantially all of the steps depicted and described in conjunction with the figures below for implementing one or more of the systems described within the present disclosure.

While the present invention will be described in detail by using various examples of a typical school or educational environment, those skilled in the art will recognize that the equipment, processes, methods and techniques described herein have broad applicability to other environments and applications where quick and efficient access to information gathering services is desirable.

Referring now to FIG. 1, a computer-based system for gathering information about message recipients and their mobile devices 100 in accordance with a preferred exemplary embodiment of the present invention comprises: a data server (computer) 130; at least one of a desktop computer 170 or a laptop computer 180; an optional telephone 160; a wireless communication device 175; and an optional mobile communication device 190 (e.g., a smartphone or Personal Digital Assistant) all connected or coupled via a local area network 120 to the Internet 195 via an Internet connection 185.

Taken together, the components of computer-based system 100 provide a platform for sending messages to and gathering information from the system of message recipients. Computer-based system 100 provides a mechanism for system users to efficiently and effectively create, schedule, and deliver messages across a wide range of message platforms and mediums and creating dynamic messages based on the information gathered.

In the most preferred embodiments of the present invention, computer-based system 100 is configured as a system that will be used to disseminate messages for an educational community in a typical school environment. In this preferred embodiment, the group of users for computer-based system 100 will typically include administrators for individual schools as well as school board and school district officials, teachers, staff, community members, parents, and students.

Network 120 represents any suitable computer communication link or similar communication mechanism, including some combination of a hardwired connection, an internal or external bus, a connection for telephone access via a modem, standard co-axial cable lines, high-speed T1 line, radio, infrared or other wireless communication methodologies (e.g., "Bluetooth," infrared (IR), etc.), private or proprietary local area networks (LANs) and wide area networks (WANs), as well as standard computer network communications over Internet 195 or an internal network (e.g. "intranet") via a wired or wireless connection, or any other suitable connection between computers and computer components known to those skilled in the art, whether currently known or developed in the future. It should be noted that portions of network 120 might suitably include a dial-up phone connection, a broadcast cable transmission line, a Digital Subscriber Line (DSL), an ISDN line, or similar public utility-like access link.

In the most preferred embodiments of the present invention, at least a portion of network 120 comprises a standard Internet connection 185 between at least some of the components of computer-based system 100 for providing access to additional network resources and other remote locations. Network 120 provides for communication between the various components of computer-based system 100 and allows for relevant information to be transmitted from device to device. In this fashion, a user of computer-based system 100 can quickly and easily gain access to the relevant data and information utilized to search, retrieve, and display information from one or more databases as described in conjunction with the preferred embodiments of the present invention.

In the most preferred embodiments of the present invention, network 120 is configured to provide relatively high-speed transmission of textual information, audio and video data and signals, and also comprises at least an Internet connection 185 for transmission of data captured by one or more computers 170 or 180 and a phone 160 for transmission of an audio signal to and from a standard phone connection. The phone connection may be interfaced to a standard phone system typically found in most homes and commercial facilities, including for example, the existing "land line" phone system infrastructure and/or digital cellular phone communication systems.

In addition to the other components shown in FIG. 1, a wireless communication access device 175 may optionally be communicatively coupled to network 120 and represents any type of wireless communication mechanism that is known to those skilled in the art to provide for wireless communication between network 120 and the various devices associated with network 120, including desktop computer 170, laptop computer 180 and phone 160 as well as mobile communication device 190. The most preferred embodiments of an acceptable wireless communication access device may comprise any type of wireless bridge, wireless router, or Wi-Fi "hotspot."

Regardless of the specific components, physical nature, and topology, network 120 serves to logically and communicatively link the physical components of computer-based system 100, thereby enabling stable and consistent communication between the components. This is especially important because in many preferred embodiments of the present invention, data server 130, desktop computer 170, and laptop computer 180 may be geographically remote and/or physically separated from each other.

Data server 130 represents a relatively powerful computer system that is made available to desktop computer 170, laptop computer 180, and/or mobile communication device 190 via network 120. Various hardware components (not shown this FIG.) such as external monitors, keyboards, mice, tablets, hard disk drives, recordable CD-ROM/DVD drives, jukeboxes, fax servers, magnetic tapes, and other devices known to those skilled in the art may be used in conjunction with data server 130. Data server 130 may also provide various additional software components (not shown this FIG.) such as database servers, web servers, firewalls, security software, and the like. The use of these various hardware and software components is well known to those skilled in the art.

Given the relative advances in the state-of-the-art computer systems available today, it is anticipated that functions of data server 130 may be provided by many standard, readily available data servers. This may also include the deployment of multiple inter-connected and redundant data servers 130 to enhance the availability and reliability of the functions provided by data server 130. Depending on the desired size and relative power required for data server 130, storage area network (SAN) technology may also be deployed in certain preferred embodiments of the present invention. Additionally, various biometric and identification verification devices for identifying users and controlling access as well as creating and verifying digital signatures (i.e., electronic signature processing) may also be included.

Desktop computer 170 may be any type of computer system known to those skilled in the art that is capable of being configured for use with computer-based system 100 as described herein. It should be noted that no specific operating system or hardware platform is excluded and it is anticipated that many different hardware and software platforms may be configured to create computer 170. As previously explained in conjunction with data server 130, various hardware components and software components (not shown this FIG.) known to those skilled in the art may be used in conjunction with computer 170. It should be noted that in the most preferred embodiments of the present invention, desktop computer 170 is linked (via wired or wireless connection) to its own LAN or WAN and has access to one or more additional data servers (not shown this FIG.).

In addition as shown in FIG. 1, a telephone 160 may be used in conjunction with computer 170 to allow audio messages and alerts to be communicated to telephone 160. In this embodiment, telephone 160 has been communicatively coupled to or otherwise interfaced with the standard telephone communication infrastructure associated with one or more users of computer-based system 100. Similarly, audio messages and various other communications and alerts may be communicated to mobile communication device 190 or other personal electronic device.

Similarly, laptop computer 180 may be any type of relatively lightweight portable computer system known to those skilled in the art that is capable of being configured for use with computer-based system 100 as described herein. This includes tablet computers (e.g., iPad®), pen-based computers and the like. Computer 180 may also be configured to allow the transmission and reception of audio signals, messages, communications, and various types of alerts via server 130 and network 120.

Additionally, netbooks, tablets, handheld and palmtop devices are also specifically included within the description of devices that may be deployed as a laptop computer 180. It should be noted that no specific operating system or hardware platform is excluded and it is anticipated that many different hardware and software platforms may be configured to create laptop computer 180. As previously explained in conjunction with data server 130, various hardware and software components (not shown this FIG.) known to those skilled in the art may be used in conjunction with laptop computer 180. It should also be noted that in the most preferred embodiments of the present invention, laptop computer 180 is linked to its own LAN or WAN and has access to its own data server (not shown this FIG.).

In general, the communication between devices associated with data server 130 will be data associated with creating and delivering messages in the most efficient and desirable manner possible, based on user preferences and priorities. The users of desktop computer 170 and/or laptop computer 180 may be program administrators, managers, teachers, community members, parents and students who are seeking to access the most relevant and valuable communication fees from the various available communication messages. Additionally, various related entities such as local and regional governments, commercial enterprises, municipalities, and their employers and agents may also have access to one or more databases located on data server 130 via desktop computer 170 and/or laptop computer 180.

It should be noted that while FIG. 1 shows only a single desktop computer 170 and a single laptop computer 180, it is anticipated that the most preferred embodiments of the present invention will comprise dozens or even hundreds of computers 170 and laptop computers 180. Each of these computers 170 and 180 will be configured to access data server 130 in an appropriately secure way so as to accomplish the specific objectives of the user of the desktop computer 170 or laptop computer 180.

For example, the service provider that controls the databases stored on data server 130 may utilize desktop computer 170 or laptop computer 180 or mobile communication device 190 to access data server 130 and create, update or otherwise modify a given database. An operator, located in a remote location, may use desktop computer 170 or laptop computer 180 to access data server 130 to retrieve information about the participants or persons and the various messages being created and delivered by the users of computer-based system 100.

In the most preferred embodiments of the present invention, multiple desktop computers 170 and multiple laptop computers 180 will all be configured to communicate simultaneously with data server 130 and with each other via network 120. In addition, the most preferred embodiments of the present invention include a Software as a Service (SAAS) or Platform as a Service (PAAS) environment where data server 130 may be operated as a message clearinghouse in a hosted operation. In this fashion, multiple desktop computers 170 and laptop computers 180 will have access to data server 130 and the databases stored thereon via a global computer network such as Internet 195. Data server 130 is further described below in conjunction with FIG. 2 below.

An optional printer and an optional fax machine (not shown this FIG.) may also be deployed for various hard copy data output requirements and may be considered to be any standard peripheral devices used for transmitting or outputting paper-based version of messages (e.g., photographs, documents, notes, transaction details, reports, etc.) in conjunction with the various requests and transactions processed by computer-based system 100 (e.g., reports, communications, statistical analyses, automated letters, etc.). Finally, it should be noted that the optional printer and the optional fax machine are merely representative of the many types of peripherals that may be utilized in conjunction with computer-based system 100. It is anticipated that other similar peripheral devices will be deployed in the various preferred embodiment of the present invention and no such device is excluded by its omission in FIG. 1.

Mobile communication device 190 is representative of any type of wi-fi or Internet enabled mobile communication device or telephone that may be communicatively coupled to computer-based system 100. This includes, for example, personal digital assistants ("PDAs"), Windows® mobile phone devices, Android® OS devices, Palm® OS devices, Pocket PC® devices, the Apple® iPod Touch®, the Apple® iPhone® and other various types of smartphones and portable communication devices. Those skilled in the art will recognize these various devices and others that are suitable for deployment as mobile communication device 190. While somewhat less powerful than computers 170 and 180, mobile communication device 190 may also be configured to wirelessly communicate with data server 130 via network 120 to send and receive messages to and from data server 130.

Given the standard functionality for devices that may be deployed as mobile communication device 190, this communication be provided by a wireless Internet connection (e.g. "wi-fi" or "wi-max") or a Bluetooth® connection. One example of the use for mobile communication device 190 in the context of computer-based system 100 would be a device that message recipient uses to receive messages and potentially access web server 222. It can also be used by a system user to interface with computer-based system 100 in order to send the messages to parents of a student based on the information gathered about message recipient's system. If it has been identified as a smartphone or mobile device, the school can use a compatible mobile app to communicate with the parent in a more optimal method. They can encourage the parent to download and make use of a customized mobile app that may allow a cheaper and more flexible means of communication.

Those skilled in the art will recognize that FIG. 1 depicts a fairly standard "client/server" type communication arrangement where data server 130 is considered to be a server and computers 170 and 180 are considered to be clients of data server 130. Additionally, those skilled in the art will recognize that the functionality of data server 130 may be deployed on either of computers systems 170 and 180 in a more traditional "stand-alone" environment. In either case, the methods of the present invention are designed to minimize the amount of data that needs to be transferred from a database to the user of computer-based system 100.

Figure 2:
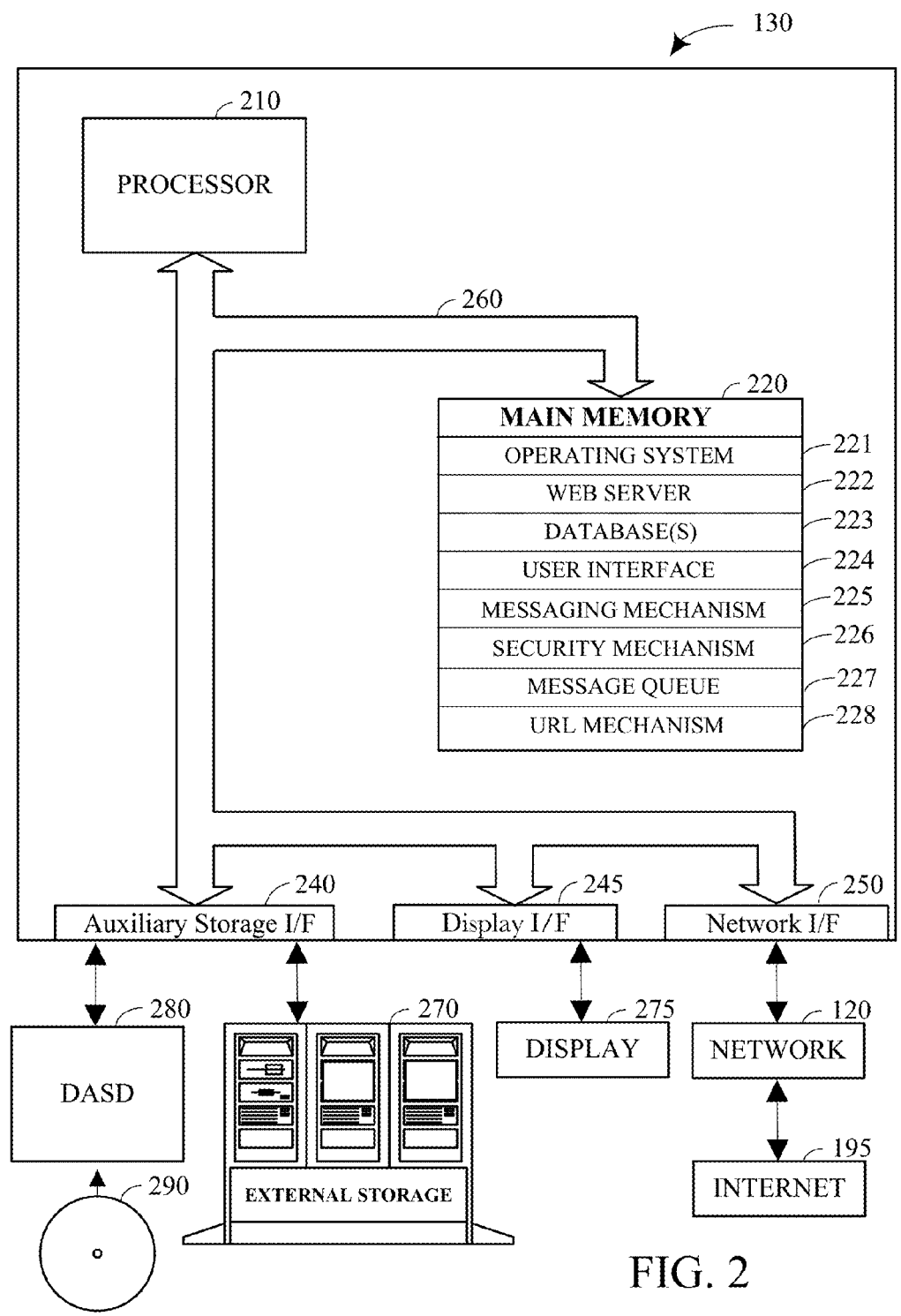
FIG. 2 is a block diagram of a server (computer) used for implementing a computer-based system for gathering information about message recipient mobile devices in accordance with a preferred exemplary embodiment of the present invention.

Referring now to FIG. 2, data server 130 of FIG. 1 in accordance with a preferred embodiment of the present invention represents one of many commercially available computer systems such as a Linux®-based computer system, an IBM® compatible computer system, or a Macintosh® computer system. However, those skilled in the art will appreciate that the methods and system of the present invention apply equally to any computer system, regardless of the specific operating system and regardless of whether the computer system is a more traditional "mainframe" computer, a complicated multi-user computing device or a single user device such as a personal computer or workstation.

Data server 130 suitably comprises at least one Central Processing Unit (CPU) or processor 210, an auxiliary storage interface 240, a display interface 245, and a network interface 250, all of which are interconnected via a system bus 260. Note that various modifications, additions, or deletions may be made to data server 130 illustrated in FIG. 2 within the scope of the present invention such as the addition of cache memory or other peripheral devices. FIG. 2 is not intended to be exhaustive, but is presented to simply illustrate some of the more salient features of data server 130.

Processor 210 performs computation and control functions of data server 130, and most preferably comprises a suitable central processing unit (CPU). Processor 210 may comprise a single integrated circuit, such as a microprocessor, or may comprise any suitable number of integrated circuit devices and/or circuit boards working in cooperation to accomplish the functions of a processor or CPU. Processor 210 is configured to execute one or more software programs contained within main memory 220. Although data server 130 depicted in FIG. 2 contains only a single main processor 210 and a single system bus 260, it should be understood that the present invention applies equally to computer systems having multiple processors and multiple system buses. Similarly, although system bus 260 of a preferred embodiment is a typical hardwired, multi-drop bus, any connection means that supports bi-directional communication in a computer-related environment could be used.

Auxiliary storage interface 240 allows data server 130 to store and retrieve information from auxiliary storage devices, such as external storage mechanism 270, magnetic disk drives (e.g., hard disks or floppy diskettes) or optical storage devices (e.g., CD-ROM). One suitable storage device is a direct access storage device (DASD) 280. As shown in FIG. 2, DASD 280 may be a DVD or CD-ROM drive that may read programs and data from a non-volatile DVD or CD disk 290.

Display interface 245 is used to directly connect one or more displays 275 to data server 130. Displays 275, which may be non-intelligent displays (e.g., "dumb") terminals or fully programmable workstations, are used to provide system administrators and users the ability to communicate with data server 130. Note, however, that while display interface 245 is provided to support communication with one or more displays 275, computer data server 130 does not necessarily require a display 275, because all needed interaction with users and other processes may occur via network 120. Additionally, in certain preferred embodiments, data server 130 may have an integrated display 275.

Network interface 250 is used to connect data server 130 to network 120 and computer-based system 100, including computer 170 and computer 180 of FIG. 1. Network interface 250 broadly represents any suitable way to interconnect electronic devices, regardless of whether the network comprises present day analog and/or digital techniques or via some networking mechanism of the future. Network interface 250 preferably includes a combination of hardware and software that allows communications on network 120.

Software provided in conjunction network interface 250 preferably includes a communication manager that manages communication with other computer systems or other network devices via network 120 using a suitable network protocol. Many different network protocols can be used to implement a network. These protocols are specialized computer programs that allow computers to communicate across a network. TCP/IP (Transmission Control Protocol/Internet Protocol) is just one example of a suitable network protocol that may be used by the communication manager contained within network interface 250.

It is important to note that while the present invention has been (and will continue to be) described in the context of a fully functional computer system with certain application software, those skilled in the art will appreciate that the various software mechanisms of the present invention are capable of being distributed as a program product in conjunction with an article of manufacture comprising software stored on a computer readable storage medium in a variety of forms, and that the various preferred embodiments of the present invention applies equally regardless of the particular type or storage medium used to actually carry out the distribution. Examples of computer readable storage media include: non-volatile and non-transitory recordable type media such as DVD and CD ROMS disks (e.g., disk 290), and transmission type media such as digital and analog communication links, including wireless communication links.

Main memory 220 suitably contains an operating system 221, a web server 222, one or more databases 223, a user interface 224, a messaging mechanism 225, a security mechanism 226, a message queue 227, and a URL mechanism 228. The term "memory" as used herein refers to any storage location in the virtual memory space of data server 130.

It should be understood that main memory 220 might not necessarily contain all parts of all components shown. For example, portions of operating system 221 may be loaded into an instruction cache (not shown) for processor 210 to execute, while other files may well be stored on magnetic or optical disk storage devices (not shown). In addition, although database 223 is shown to reside in the same memory location as operating system 221, it is to be understood that main memory 220 may consist of multiple disparate memory locations. It should also be noted that any and all of the individual software mechanisms or components shown in main memory 220 might be combined in various forms and distributed as a stand-alone program product. Finally, it should be noted that additional software components, not shown in this figure, might also be included.

Operating system 221 includes the software that is used to operate and control data server 130. In general, processor 210 typically executes operating system 221. Operating system 221 may be a single program or, alternatively, a collection of multiple programs that act in concert to perform the functions of an operating system. Any operating system now known to those skilled in the art or later developed may be considered for inclusion with the various preferred embodiments of the present invention.

Web server 222 may be any web server application currently known or later developed for communicating with web clients over a network such as the Internet. Examples of suitable web servers 222 include Apache web servers, Linux web servers, and the like. Additionally, other vendors have developed or will develop web servers that will be suitable for use with the various preferred embodiments of the present invention. Finally, while depicted as a single device, in certain preferred embodiments of the present invention web server 222 may be implemented as a cluster of multiple web servers, with separate and possibly redundant hardware (e.g., load balancers) and software systems. This configuration provides additional robustness for system uptime and reliability purposes. Regardless of the specific form of implementation, Web server 222 provides access, including a user interface, to allow individuals and entities to interact with graphical user interface 224, including via network 120 of FIG. 1.

In the present invention, web server 222 is configured to log the URL requests made and the results of the web server's queries. The queries may request information such as the user agent, information about the system making the request, the system's GPS coordinates or the time of the request among others. Some preferred embodiments automatically modify the list of message recipient profiles in database 223 to reflect this request information, assuming that, if the user agent is one developed for a mobile device or the system is a mobile system, the message recipient uses a smartphone or an app compatible mobile device. The most preferred embodiments are configured to send HTML documents based on the system or user agent making the request. This may include sending them an informational page if it is not a mobile system or a mobile system incompatible with the available mobile apps, and, if it is a compatible mobile system, sending them a page with a download link for a mobile app compatible with their mobile device.

Database 223 is representative of any suitable database known to those skilled in the art. In the most preferred embodiments of the present invention, database 223 is a Structured Query Language (SQL) compatible database file capable of storing information relative to various items that may be of interest to the users of computer-based system 100 of FIG. 1. In the most preferred embodiments of the present invention, database 223 will comprise a plurality of information that may be useful to an organization or individual that wants to provide communication messages for consumption by one or more message recipients, in conjunction with a preferred embodiment of computer-based system 100 of FIG. 1.

Graphical user interface 224 is a software component that provides the users of computer-based system 100 of FIG. 1 a means for interacting with the various components of computer-based system 100. One graphical user interface 224 is a web browser based interface, accessible to the users of computer-based system 100 services via any standard web browser from any computer that is connected to the Internet. Additional details on graphical user interface 224 are presented below.

Additionally, at least one preferred embodiment of the present invention comprises a graphical user interface deployed on a mobile communication device 190. In this embodiment, a graphical user interface may be offered via an "app" customized for mobile communication device 190 or via a web browser based interface provide via a connection to data server 130, allowing the user of mobile communication device 190 to access messaging mechanism 225 and database 223. In either case, the consumer of the aggregated communication messages provided by data server 130 will be accessible and customizable via the graphical user interface provided in conjunction with mobile communication device 190.

In at least one preferred embodiment of the present invention for gathering information from the device of message recipients in an educational environment, database 223 of FIG. 2 will typically include a plurality of database records containing information about multiple schools and students (e.g., school location, student names, grades, dates and times of attendance, etc.) as well as information about teachers and parents (e.g., names and addresses, contact information, employment information, family information, etc.), and entries which are defined as specific situation/circumstances for various performance and event applications (e.g., club, sports, or other extracurricular participation data for identifying relevant messages for a student or group of students) as well as information providing for tracking, analyzing and reporting information about message originators, message recipients, the number and quantity of messages created and sent. This information may be provided to interested and authorized users of computer-based system 100 of FIG. 1.

Database 223 will also store user profiles (e.g., message originator profiles, message recipient profiles, organization profiles, etc.) containing detailed information about each user or group of users, including user communication preferences, phone numbers, email addresses, message delivery preferences, schedules, and prioritization, permissions, home and work addresses, etc. In this fashion, a message originator with access to database 223 will be provided with the capability of quickly and easily creating multiple messages for delivery to one or more message recipients. It should be noted that email addresses, phone numbers, SMS number, facsimile numbers, Instagram®, Facebook® or Twitter® "handles," and other variables may be used as "message recipient identifiers" to provide targeted communications to one or more uniquely identified message recipients via a mobile communication device.

In at least one preferred embodiment of the present invention, teachers and staff members can add relevant information to database 223 of FIG. 2 in order to enhance the efficiency of the messages being sent by the users of computer-based system 100. For example, District or school administrators will be able to specify or limit message delivery options to approved message recipients, approved communication platforms and approved message delivery times for the delivery of messages via computer-based system 100, thereby limiting the available options to those that are in compliance with the school or district communication policies. Within these parameters, teachers will be allowed to create specialized messages for their class or students and/or their parents and guardians. Similarly, coaches for the student athletes attending the school will be able to create specialized messages for their sport or team. This will allow for more highly customized messages, based on the availability of the messaging options.

Those skilled in the art will recognize that other types of information for other types of data that may be used in other applications (e.g., historical, informational, technical, etc.) may be stored and retrieved as well. While database 223 is shown to be residing in main memory 220, it should be noted that database 223 might also be physically stored in a location other than main memory 220. For example, database 223 may be stored on external storage device 270 or DASD 280 and coupled to data server 130 via auxiliary storage I/F 240. Additionally, while shown as a single database 223, those skilled in the art will recognize the database 223 may actually comprise a series of related databases, logically linked together. Depending on the specific application and design parameters, database 223 may take many different forms when implemented.

The most preferred embodiments of computer-based system 100 of FIG. 1 will include a messaging mechanism 225 in main memory 220. Messaging mechanism 225 will generally comprise a series of task oriented (e.g., message assembly, message scheduling, etc.) routines. Messaging mechanism 225 is an automated programmable system that is capable of assisting message originators and message recipients with the various tasks associated with generating one or more messages or message events, by gathering, monitoring and using the information stored in database 223 by users of computer-based system 100. In the most preferred embodiments of the present invention, messaging mechanism 225 will be configured to manage and coordinate the delivery of messages from message originators to message recipients via message queue 227. This may include email messages, tweets, audio and video data, RSS fees, and/or SMS text messages to message recipient's computers, telephones, cell phones or other mobile communication devices such as mobile communication device 190 of FIG. 1. Messaging mechanism 225 may also be used to generate hard copy messages (e.g., mail merge letters, greeting cards, memos, etc.) that are then sent via standard U.S. Postal Service or some type of commercial message delivery company.

In the most preferred embodiments of the present invention, messaging mechanism 225 and message queue 227 are configured to send messages to a message recipient via at least one communication platform. In order to identify a smartphone, the system will most preferably send a unique URL created by URL mechanism 228 to the message recipient. Since it is desired that the message recipient be the one to access the unique URL, the message should be personal and not publicly available. In most preferred embodiments, the communication platform used also allows for embedding a URL link into a message in order to optimize the intended actions to be performed by the message recipient. Lastly, the most preferred embodiments also use a communication platform primarily intended to be accessed and viewed using a mobile phone. This increases the ease and likelihood of the intended actions of the message recipient. An example of a communication platform that meets these standards is SMS messaging. SMS messages are primarily viewed by an individual on a mobile phone and allows for URL links to be embedded in the text message.

While it is necessary that messaging mechanism 225 is configured to be able to use at least one communication platform as described above, the most preferred embodiments may be configured to use multiple communication platforms. Integrating computer-based system 100 with additional message creation and delivery systems can improve message creation and delivery. If a message recipient is identified as having a smartphone, the system may encourage them to set their communication preferences to receive messages via a mobile app or other smartphone enabled means. The combination of systems may improve smartphone identification methods since more than one communication platform may be available for sending the message containing the unique URL to the message recipient.

In addition, the most preferred embodiments of the present invention comprise security mechanism 226 for verifying access to the data and information contained in and transmitted to and from data server 130. Security mechanism 226 may be incorporated into operating system 221 and/or web server 222. Additionally, security mechanism 226 may also provide encryption capabilities for other components of computer-based system 100 of FIG. 1, thereby enhancing the robustness of computer-based system 100 of FIG. 1. Security mechanism 226 is most preferably configured to protect the integrity and security of the information and messages transmitted via network 120 of FIG. 1.

Further, depending on the type and quantity of information stored in database 223 and accessed by graphical user interface 224, security mechanism 226 may provide different levels of security and/or encryption for different computer systems 170 and 180 of FIG. 1 and the information stored in database 223. The level and type of security measures applied by security mechanism 226 may be determined by the identity of the message recipient and/or the nature of a given request and/or response. In some preferred embodiments of the present invention, security mechanism 226 may be contained in or implemented in conjunction with certain hardware components (not shown this FIG.) such as hardware-based firewalls, switches, dongles, and the like.

Message queue 227 is a specialized memory location that is configured to store messages for delivery to the specified message recipients, at a pre-determined time. Messages will be placed into message queue 227 by messaging mechanism 225. Since the creation of a message to be delivered at a later time by a message originator is a standard feature of computer-based system 100, the order in which the messages were created or stored in database 223 will not always match the delivery schedule as determined by messaging mechanism 225.

URL mechanism 228 will generally comprise a series of task-oriented routines. It is configured to create unique URLs to be stored in database 223 and utilized in the identification of mobile communication devices. In certain preferred embodiments, URL mechanism 228 creates URLs as requested by the users of computer-based system 100, either one at a time or any number designated. Each URL is then assigned to a message recipient stored in database 223. In some embodiments, URL mechanism 228 is configured to accept a list of message recipient identifiers (e.g., phone numbers or email addresses) associated with a plurality of message recipient profiles and assign each message recipient (and, by extension, the user of the associated mobile communication device) a unique URL. The most preferred embodiments also send the unique URL to web server 222 for later use.

In some preferred embodiments of the present invention, system 100 may be configured to send a custom URL to a message recipient (e.g., via SMS or email message). "Custom URL" is a term of art that refers to setting up a URL scheme for launching an application or performing some task. The custom URL will typically contain a link configured to launch a mobile app that has been installed on the message recipient's mobile communication device. When the message recipient selects or "clicks" on the custom URL, the mobile device will attempt to open the mobile app on the message recipient's mobile communication device. If the mobile app has not been installed on the message recipient's mobile device, a programming construct or protocol (e.g., webview delegate) that defines methods that is activated when web content is loaded can be used to detect that the custom URL did not open the mobile app.

System 100 will then send a second custom URL to the message recipient where the second custom URL contains a link to a hosted site under the control of the message originator. When the message recipient selects or clicks on the second custom URL, system 100 will record that the user has clicked on the custom URL and redirect the message recipient to an Internet location where the appropriate mobile app may be downloaded by the message recipient. This process may be repeated as necessary and system 100 may be configured to update the message recipient's profile once the installation of the mobile app has been confirmed.

In at least some preferred embodiments of the present invention, after the message recipient has downloaded the mobile app and the mobile app has been installed on the message recipient's mobile communication device, the mobile app will prompt the message recipient to associate the telephone number or SMS device number for the mobile communication device on which the mobile app has been installed. For example, in some embodiments of the present invention, after installation of the mobile app, the mobile app may be configured to prompt the message recipient's to send a message to system 100 or to reply to a push notification so that system 100 can verify that the message recipient has successfully downloaded and installed the mobile app. Similarly, in some preferred embodiments of the present invention, once the mobile app has been successfully downloaded and installed, the mobile app may be configured to automatically send a message to system 100, confirming that the mobile app has successfully been downloaded and installed on the message recipient's device.

In any case, once the mobile app has been successfully downloaded and installed on the message recipient's mobile communication device, and once the phone number and/or SMS number for the mobile device has been captured or verified, the message recipient's profile, stored in database 223, will be updated by system 100 to reflect this information. System 100 may also be configured to change the message recipient's contact and messaging preference settings (e.g., overriding or resetting any default or other previously established messaging preferences).

For example, system 100 could be configured to reset or override any of the message recipient's preferences for receiving phone messages or text messages and begin sending push notifications to the message recipient's mobile communication device. In some preferred embodiments of the present invention, after a message recipient has downloaded the mobile app to their mobile communication device, system 100 may be configured to send a custom "deep link" to the message recipient. When the message recipient clicks on the deep link, the mobile app may be configured to display a settings configuration page within the mobile app or redirect the message recipient to a webpage configuration page.

In other preferred embodiments of the present invention, system 100 may be configured to automatically update settings for the message recipient's mobile communication device. In yet other preferred embodiments of the present invention, system 100 may be configured to display a setting configuration page to the message recipient after the message recipient has selected or clicked on a link or otherwise sent a response to system 100 that the message recipient wishes to configure their mobile communication device, after which the message recipient will then be provided with access to a user interface that will allow them to conveniently update the settings for their mobile communication device with the settings being stored in the message recipient's user profile.

In the most preferred embodiments of the present invention, the various components of computer-based system 100 are able to communicate using multiple communications protocols and systems (e.g., Voice over IP or "VoIP", email, SMS, RSS, Plain Old Telephone Service or "POTS", etc.). Those skilled in the art will recognize that the communication protocols used herein may be readily adapted and configured to allow for the rapid and efficient transmission and receipt of message by and between the various components of computer-based system 100. This would also include the ability to control and customize the input and output of computer-based system 100 for integration with other systems. While a specific exemplary embodiment of a suitable server 130 has been provided above, those skilled in the art will recognize that many other suitable computers (with more or fewer features) may be substituted for the specific example provided herein within departing from the spirit and scope of the present invention.

Figure 3:
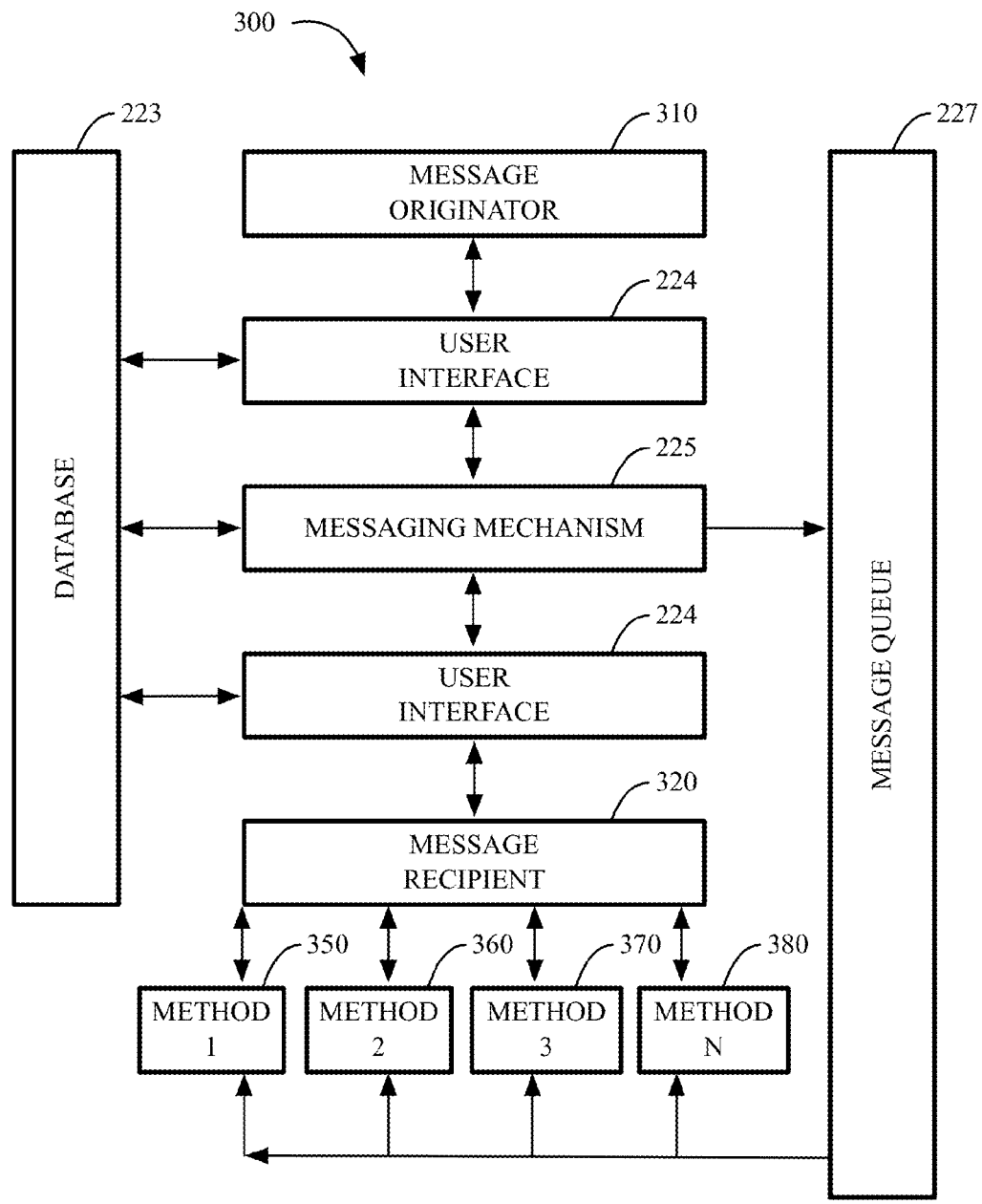
FIG. 3 is a block diagram of the interaction between the system mechanisms implemented in the computer-based system and the mobile device of the user in accordance with a preferred exemplary embodiment of the present invention.

Referring now to FIG. 3, a block diagram 300 depicting the interactions of message recipient interactions with computer-based system 100 of FIG. 1 is depicted. As shown in FIG. 3, a message originator 310 will interact with user interface 224. By accessing user interface 224, message originator 310 can input and modify the data contained in database(s) 223, including accessing database 223 to create and send messages to a message recipient 320. As previously explained, user interface 224 is configured to programmatically interact with messaging mechanism 225 and database 223 of FIG. 2, specifically for the purpose of processing the information necessary to transmit messages between message originator 310 and message recipient 320.

Additionally, message recipient 320 may have multiple devices that have been configured to receive messages from message originator 310. Message originator 310, in order to ensure that message recipient 320 receives the desired messages, may opt to configure a message to be sent via multiple communication methods, such as method 350, method 360, method 370, and method 380. Each of method 350, method 360, method 370, and method 380 comprises a combination of a specific communication platform and a specific device. For example, method 350 may comprise a message from message originator 310 delivered to a cell phone via SMS.

In at least some preferred embodiments of the present invention, SMS messaging is an integral means of communicating with the message recipient. While messaging mechanism 225 may be configured to communicate with the message recipient in a variety of ways, SMS messaging is the most preferred means used for the method of the present invention, provided that message recipient 320 has an SMS capable mobile device. The reason for preferring SMS as a communication platform is related to the relatively private nature of an SMS message and the fact that the SMS platform allows URLs to be embedded in the SMS. Method 360 may comprise transmission of a message from message originator 310 that is delivered to a cell phone via a social networking platform using Wi-Fi. Method 370 may comprise an email message from message originator 310 delivered to a computer via the Internet.

Figure 4:
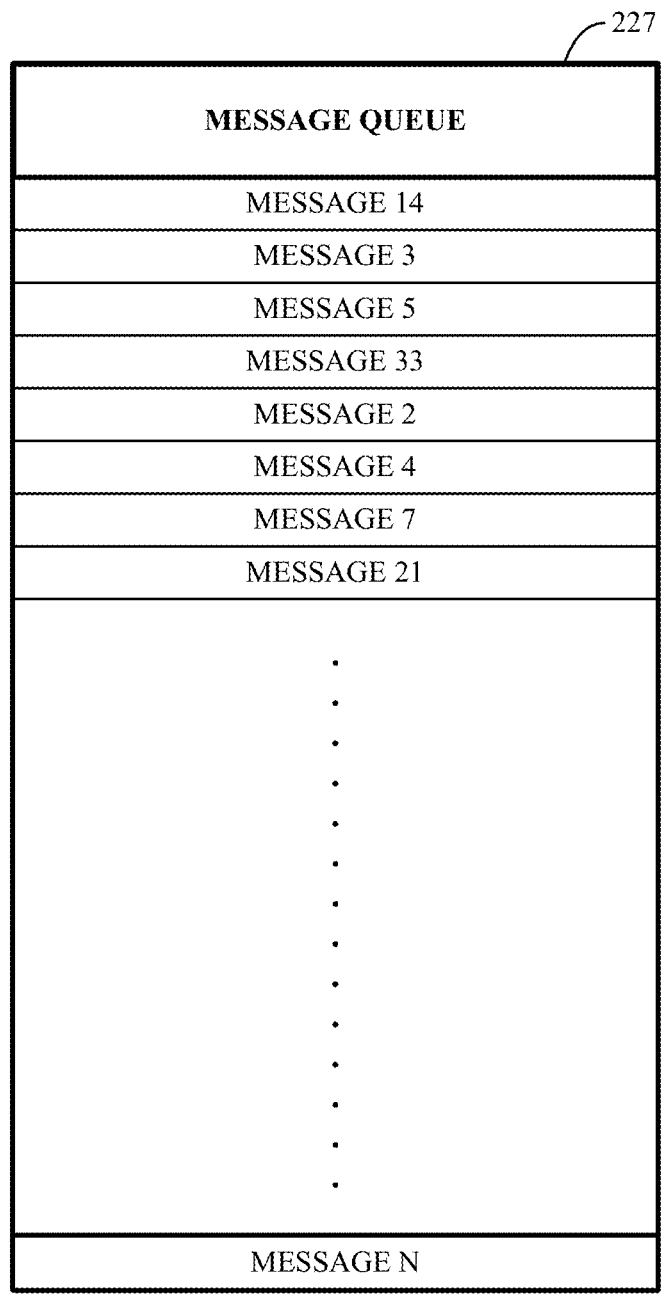
FIG. 4 is a flow chart of a method of creating the messages with unique URLs, sending the messages to the associated telephone and log the access information of the associated web site in accordance with a preferred exemplary embodiment of the present invention.

Referring now to FIG. 4, a block diagram of a plurality of messages stored in message queue 227 is depicted. As shown in FIG. 4, the messages are not necessarily stored in message queue 227 in the order in which they were created. Instead, message queue 227 is a dynamic message queue and the messages are typically positioned in message queue 227 in the order in which they are to be sent to the selected message recipients. The exact timing for delivery of each message in message queue 227 may be determined by using the time specified by the message originator for delivery of the message and/or the preferences established by the intended message recipient 320.

It is important to note that a "delivery window" may be established by computer-based system 100 of FIG. 1. Computer-based system 100 may store messages in message queue 227 and the time specified for delivery by message originator 310 may serve as the baseline for delivery. However, depending on a variety of factors, including the number of message recipients 320, message or communication platform specified for delivery, etc., the actual delivery time may be programmatically adjusted by messaging mechanism 225 of FIG. 2. It is also important to note that while message originator 310 creates a single message and a delivery time for the message, message originator 310 may specify a different delivery time for each message recipient 320, depending on the preferences of message originator 310. Similarly, even with the same specified delivery time for multiple message recipients 320, each message recipient 320 may receive their message at a different time, depending on their message receipt preferences.

Figure 5:
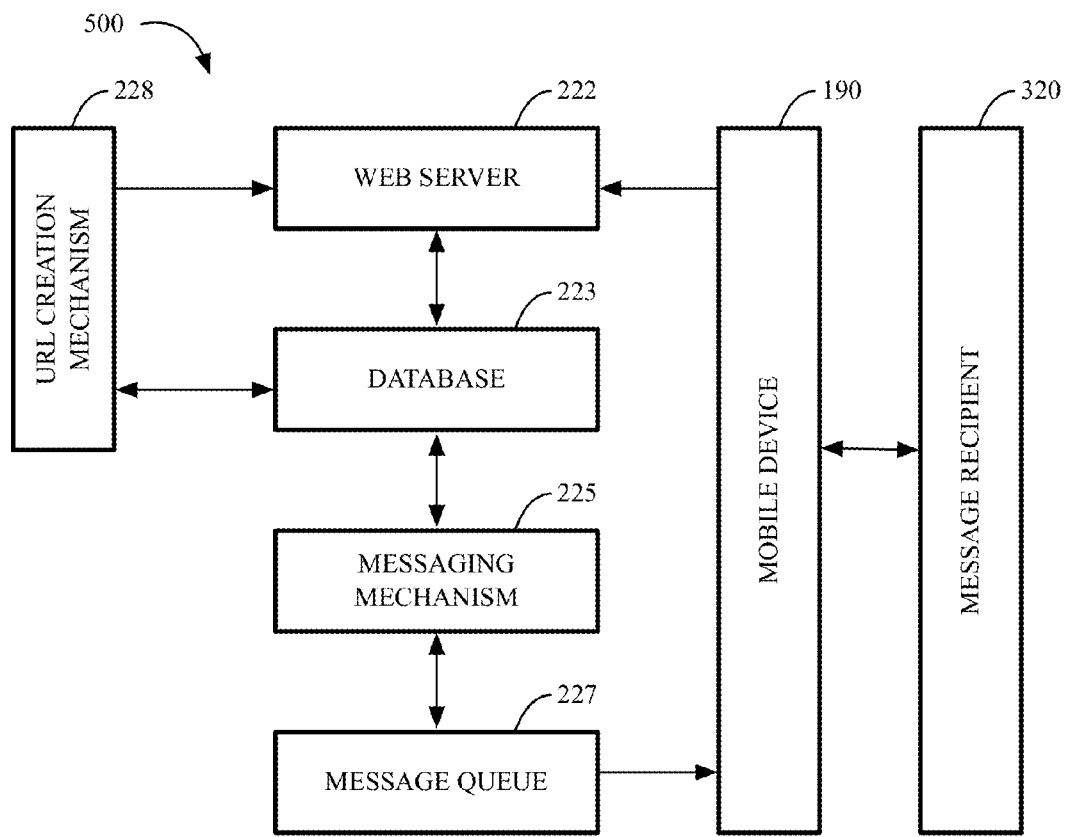
FIG. 5 is a schematic representation of a user interface for viewing the list of individuals associated with the message recipient identifiers used by the system in accordance with a preferred exemplary embodiment of the present invention.

Referring now to FIG. 5, a block diagram 500 illustrating the interaction of the various mechanisms of system 100 of FIG. 1 is depicted. URL mechanism 228 is configured to create unique URLs. URL mechanism 228 will most preferably create a unique URL for every message recipient identifier stored in the message recipient profiles in database 223. Additionally, system 100 may be configured to use URL mechanism 228 in a variety of ways to perform this function.

For example, some preferred embodiments may be configured so that URL mechanism 228 creates each unique URL one at a time. Another preferred embodiment may be configured so that unique URL mechanism 228 receives the full list of message recipient profiles, phone numbers or other contact information and creates a unique URL for each in a batch fashion. After creation, URL mechanism 228 will store the unique URLs in the appropriate user and mobile device profiles contained in database 223. With the creation of the unique URLs, each unique URL will usually be associated with a single message recipient profile or mobile communication device 190. The unique URLs and associated message recipient profiles and/or message recipient identifiers are stored in records contained in database 223 in such a way as to show this relationship.

Database 223 is configured to store all relevant information. This includes the records for message recipient profiles, configuration and identification information for each mobile communication device 190, and/or contact information as well as any unique URLs created for each record for each message recipient 320. Each message recipient 320 added to the database 223 will include a plurality of information, such as which message recipients 320 have a smartphone but has not downloaded the mobile app for their respective organization. Other information includes information used to create one or more dynamic messages, such as geolocation information to identify message recipients 320 who might be near a school or other location for emergency notification purposes. It also stores the logs from web server 222. In some preferred embodiments it also includes login information for a related mobile app.

Messaging mechanism 225 is configured to transmit one or more messages to one or more message recipients 320 via mobile communication devices 190. Based on the message recipient profiles based and the unique URLs created by URL mechanism 223, the appropriate message, message recipient 320, and communication platform can be identified. The most preferred embodiments of the present invention are configured to send an SMS message to SMS-capable mobile communication devices 190 wherein each SMS message will contain the unique URL. In some embodiments the URL is embedded in the SMS message for extraction by an app. The most preferred embodiments of the present invention may utilize one or more templates to make this process fast and easy for large numbers of message recipients 320. Some embodiments of the present invention will allow the content of the SMS to be customizable on an individual or group-wide basis.

In at least some preferred embodiments of the present invention, messaging mechanism 225 will be configured to send follow-up messages to remind message recipients about the availability of the mobile app provided by the message sender's sponsoring organization. Most of these embodiments will define a specific desired activity to be performed by the message recipient 320 (e.g. downloading a mobile app offered by the message sender's organization), and will be configured to track whether or not the desired activity has been completed. Additionally, certain preferred embodiments may also be configured to periodically remind the message recipients 320 to complete the desired activity (e.g., by sending an SMS or other communication). Most preferred embodiments of the present invention will be configured to send reminder messages only after the unique URL associated with message recipient 320 has been accessed by message recipient 320 so that the information gathered from mobile communication device 290 indicates that message recipient 320 associated with the unique URL has a compatible mobile device 290.

In the most preferred embodiments of the present invention, each unique URL is intended to point to a web page. When each unique URL is accessed by a mobile communication device 290, the mobile communication device 290 sends a request that will be routed over a network (e.g., network 185 of FIG. 1) to web server 222 that stores the requested web page content if a website for the requested unique URL exists. In the present invention, web server 222 is configured to query for the desired information and log all desired information. Examples of the type information that could be acquired by queries from web server 222 include: device type, device model; device operating system and version; web browser version; language; and mobile device geolocation information. In the most preferred embodiments, URL mechanism 228 creates a unique URL and sends the unique URL to web server 222, which is configured to specifically log the access information of any request for each unique URL. Web server 222 is configured to cross reference the unique URLs stored in database 223 with the requests it receives from unique URLs in SMS messages as a way to identify the appropriate mobile communication device and associated message recipient.

Those skilled in the art will recognize that there are a number of ways to identify the software and hardware associated with a mobile communication device. For example, Google Analytics will automatically track the different types of browsers people use to reach a website, along with other configuration about the systems that run those browsers (e.g., operating system, screen resolution, screen colors, Flash version, and Java support), user language, user location, etc.

Similarly, most web browsers are configured to provide certain parameters to web servers by using what is called a "user agent string" or similar functionality. The web browser may be identified by a web server using this string of information. A web server can then use this identifying information to make a logical choice in its programming or formatting of the content sent to the mobile communication device depending on what type of browser is being used by the mobile communication device (e.g., what OS they are using, what version, etc.).

For example, a typical Apple® mobile device will send the following information to a web server from the iOS® version of the Safari® web browser
(iPhone®; U; CPU iOS 2_0 like Mac® OS X; en-us)
 The platform string. "iPhone is replaced with iPod when running on an iPod touch and iPad when running on an iPad.
AppleWebKit/525.18.1
 The WebKit® engine build number.
Version/3.1.1
 The Safari® family version.
Mobile/XXXXX
 The mobile version number, where XXXX is the build number.
Safari/525.20
 The Safari® build number.

As can be seen, an Apple® device provides information such as what device is being used (iPhone®, iPod® Touch®, iPad®), what version of Safari® is being used, what version of iOS® is installed, etc.

The same is true for Chrome® on Android® devices:
Mozilla/5.0 (Linux; <Android Version>; <Build Tag etc.>) AppleWebKit/<WebKit Rev>(KHTML, like Gecko) Chrome/<Chrome Rev>Mobile SafarikWebKit Rev>

Chrome® will report the version of Android® that is running, which also usually identifies the device that it is running on (aka Samsung® Galaxy® S4 build v. xxxx), what version of Chrome® it is using, etc.

In order to detect the location of a device through a browser, a different function is used. It is a function of JavaScript and may be actively requested by web server 222 from the client browser, which will then prompt the user for permission. The function is platform independent and will merely wait for the client browser to return a location to web server 222.

Messaging mechanism 225 may use various methods for determining when to include a unique URL in a message. One method is to include the unique URL in a message which has been determined by a preconfigured order, such as the first message sent to a message recipient, the first message sent to a specific phone number or message recipient identifier for a given message recipient, or the first message which contains sufficient space for the unique URL. For example, in some modes of communication such as an SMS message or a Twitter® tweet, the length of the message will generally not exceed a predetermined length, such as 140 characters.

System 100 may be configured to monitor the size of the messages which are being sent and if an SMS message is scheduled to be sent but still has additional space for a unique URL and system 100 has determined that there is sufficient space to embed the URL, then the system may embed the URL in the message. Similarly, some SMS messages are restricted to 140 characters, and a message intended to be sent by a message originator may require the use of only 100 characters; the system may then determine that a URL of 40 or less characters could be inserted into the message and may then insert the URL.

When a message recipient uses the designated mobile app associated with a mobile communication device, the system can determine the contact number for that device, such as the telephone number that also receives text messages; and store that unique contact identifier in the mobile app stored on the message recipient's mobile communication device. This unique message recipient identifier can then be associated with the mobile communication device used so that the system can send pop up messages to that specific mobile communication device. In some embodiments, when users opens the mobile app for the first time or some other time, the mobile app prompts the user to enter the message recipient identifier, such as the phone number of the device, and the mobile app then sends that information to computer based system 100.

Once the system has determined that a message was sent via SMS to a user with a link, and that the user then accessed the device, and installed the app, the system can then use the unique identifier for that device to send push notifications instead of SMS messages or other more cost messages. In some embodiments, the system has a list of the users who have provided a SMS message number, and after the system has confirmed that a user can receive push notifications on that device, the system then changes the contact settings for that device, such as only sending push notifications. One method for determining whether a user's device can receive push notifications is by determining which SMS numbers were sent a unique URL, determining for which of those unique URLS a user accessed the website associated with the URL, and for which the website then redirected the user to an app store to download an app. In some embodiments, the system provides those users a notice that messages will be sent via push notification instead of SMS and requests that the user confirm their acceptance of the change.

Most preferred embodiments of the present invention provide for configuration of web server 222 to route the web browser request from message recipient 320 according to the information gathered from the associated mobile communication device 190 used by message recipient 320 when accessing the unique URL. Some preferred embodiments of the present invention may provide for configuring web server 222 to reroute one or more requests to access the unique URL to one or more designated web pages based upon the web browser and operating system used to generate the access request. Most of these preferred embodiments of the present invention will have a related mobile app and requests to access the unique URL received from certain web browsers will lead message recipient 320 to a web page that provides for downloading the mobile app that is compatible with the mobile device being used by message recipient 320.

In other preferred embodiments of the present invention, web server 222 will be configured to reroute a request from message recipient 320 to a specific web page based on geolocation date, time or other variable information in order to make the communication with message recipient 320 more dynamic and meaningful, based on the specific conditions associated with the variable information.

In some preferred embodiments of the present invention, web server 222 is also configured to provide services for the mobile app provided by the message originator. Many mobile apps require a user profile to be established for each potential message recipient 320 in order to access the mobile app. Then, whenever a message recipient uses the mobile app, web server 222 can authenticate the user by using the information contained in the user profile (e.g., login credentials) and track other data and statistics related to the interactions with message recipient 320. In most of these preferred embodiments, the profile for message recipient 320 is the same as the profile for message recipient 320 stored in database 223. The mobile app login information may be stored in database 223 with the profile for message recipient 320 in order to make cross-reference easy. In some preferred embodiments this allows computer-based system 100 to track message recipients 320 that have compatible mobile communication devices 190 but have not downloaded the appropriate mobile app. This functionality enables the sponsoring organization to generate automatic follow-up reminders if desired.

Figure 6:
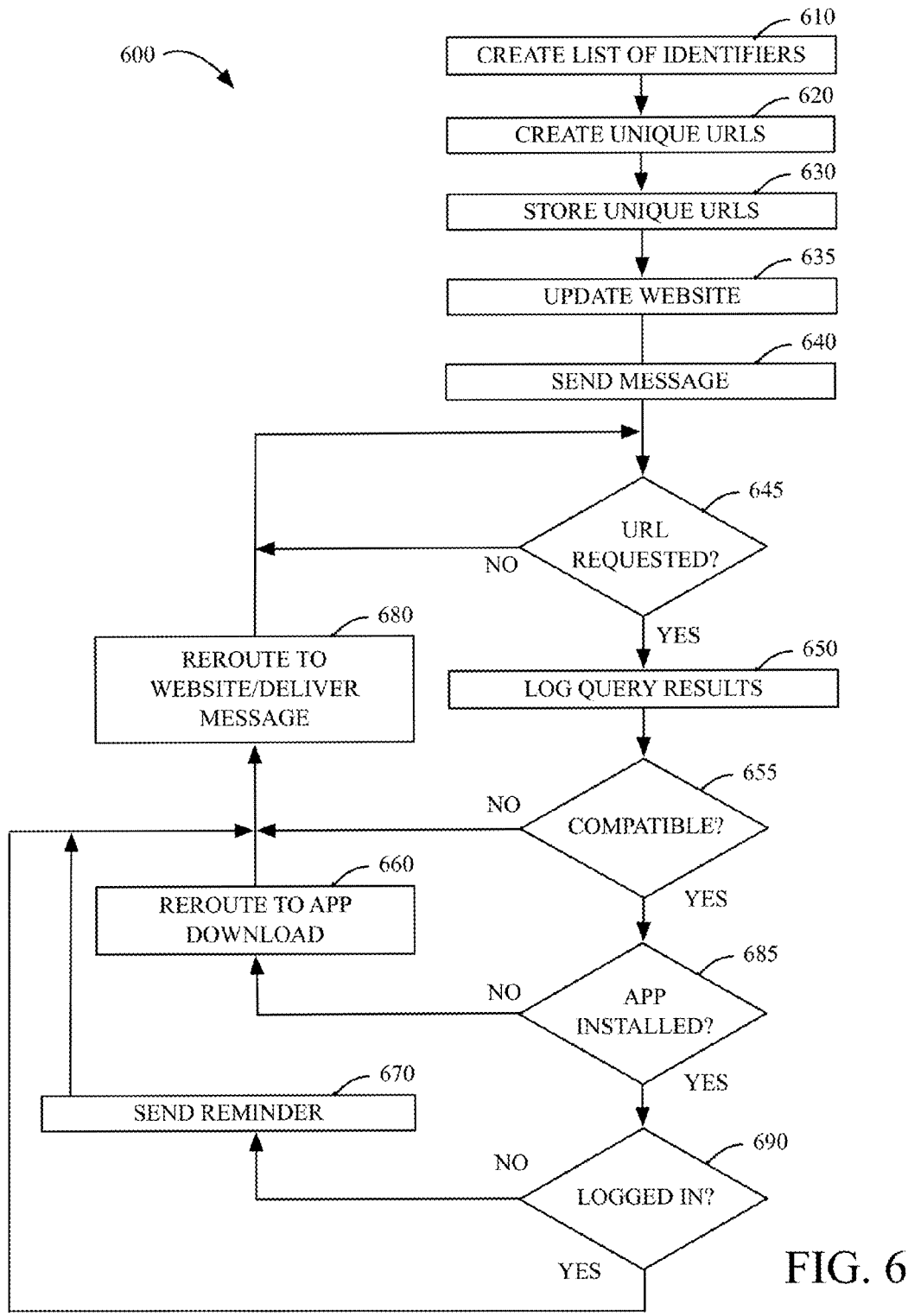
FIG. 6 is a schematic representation of a user interface for sending follow-up messages to a group selected from the message recipient identifiers used by the system in accordance with a preferred exemplary embodiment of the present invention.

Referring now to FIG. 6, a flow chart for a method 600 for creating messages (e.g., an SMS message or an email message), where each message contains a unique URL, is depicted. As shown in FIG. 6, unique URLs are created, included in SMS messages, and sent to specific mobile communications devices by accessing the message recipient identifiers. Additionally, any website access information is logged or stored and mobile app download reminders are sent to message recipients if they are accessing the website with something other than the message originator's designated mobile app. The content delivered to the message recipient's mobile communication device may also be reformatted for presentation on a mobile communication device if the content is being delivered to a mobile web browser and not via the designated mobile app. It should be noted that FIG. 6 depicts only a single preferred embodiment of the present invention and is intended to provide salient details for illustrative purposes only.

As shown in FIG. 6, a list of message recipient identifiers (e.g., telephone numbers) required for SMS messaging can be created or accessed (step 610) by referencing message recipient profile data from database 223 of FIG. 2. Each telephone number will, most preferably, be associated with a single mobile communication device 190 and this will typically be the mobile phone for the message recipient. For other personalized communication platforms used in other embodiments of the present invention, the specific contact information and message recipient identifier required may be different, and that information could also be stored in and extracted from database 223.

Computer-based system 100 determines which features are available for a mobile communication device or an operating system for the mobile communication device. Computer-based system 100 configures the content to be displayed well on the operating system, the device, or the browser of the device. In some embodiments, the device and the operating system allow for computer-based system 100 to track the geo-location of the user. In an emergency, if computer-based system 100 is tracking the geo-location of the user, then computer-based system 100 may optimize its content and also the manner of displaying the content for the user. For example, if an administrator instructs computer-based system 100 to send a message about a flood, and the computer-based system 100 is tracking the geo-location of the user, then the computer-based system 100 may update the message.

For example, the message may read that "You should be aware that you are [distance] from a flood." Computer-based system 100 can then use the geolocation of the user, a current map of the flood area, calculate the distance of the user from the flood area after the user has selected the message or has instructed the device to display a screen with the message, and computer-based system 100 can then substitute the [distance] variable of the message with real-time or near-time information about the user's distance from the flood.

Once a list of telephone numbers or other relevant message recipient identifier has been identified, URL mechanism 228 creates a unique URL for each of the telephone numbers on the list (step 620) and each of the unique URLs are stored in database 223 (step 630). Each of the unique URLs is associated with a website that is accessible via a request made to web server 222 so that if access to a unique URL is requested by a message recipient, the access request is sent to web server 222.

In at least some preferred embodiments of the present invention, URL mechanism 228 is configured to create each unique URL one at a time (e.g., as part of entering a message recipient profile into a record stored in database 223). In other preferred embodiments of the present invention, URL mechanism 228 is configured to receive a full or partial list of message recipient profiles, phone numbers or other message recipient identifiers and create a unique URL for each in a batch operation and the unique URLs will be stored in database 223 and associated with specific telephone numbers for specific message recipients.

The unique URLs are assigned such that each unique URL is associated with no more than one specific message recipient identifier. This will typically mean each unique URL is associated with a single message recipient profile except in a situation where multiple message recipients share a single mobile communication device (e.g., shared cell phone). In this case, the use of a shared mobile communication device may lead to a unique URL being associated with multiple message recipient profiles, but the unique URL will still be associated with a single mobile communication device telephone number. Similarly, a single message recipient may have multiple mobile communication devices and, accordingly, multiple unique URLs may be associated with that message recipient's profile, with a different unique URL being associated with each mobile communication device.

Those skilled in the art will recognize that it may be desirable to reuse or "recycle" the unique URLs after a specific, user configurable period of time so as to ensure that a supply of unique URLs will always be available. In this embodiment, "unique" URL may mean "unique" only for a given period of time and one or more "unique" URLs may, in fact, be associated with one message recipient's mobile communication device at one point in time and then associated with another message recipient's mobile communication device at another point in time. For this embodiment, it will be necessary to ensure that the previous website page that was associated with the recycled URL is no longer associated with that URL so as to prevent inadvertent disclosure of information associated with a different message recipient. In the case of information protected by the Family Educational Rights and Privacy Act of 1974 ("FERPA"), it is very important to ensure that confidential information is not inadvertently disclosed so URLs that are linked to FERPA-related messages would generally not be recycled.

In at least some preferred embodiments of the present invention, URL mechanism 228 will also be configured to send the unique URLs to web server 222 to monitor and track requests for website access. Some preferred embodiments configure web server 222 to reroute access to one or more websites based upon the information gathered from the mobile communication device used by the message recipient when making the request to access the unique URL. The most preferred embodiments will configure web server 222 to update the website associated with the unique URL before sending anything to the message recipient in response to the access request (step 635). After appropriate updates have been made, a message can be sent to one or more message recipients (step 640).

As previously mentioned, messaging mechanism 225 may include a unique URL in each message (e.g., SMS text messages or email messages) and send each message to the mobile communication device associated with the unique URL it contains. Those skilled in the art will recognize that various methods of communication may be used to send the messages with included URLs (e.g., email messages or SMS sent to a mobile communication device, or a "tweet" sent to a Twitter® account). The most preferred embodiments use a method wherein the messages are primarily viewed on mobile communication devices. Some embodiments may be configured to send the messages via message queue 227.

After the message(s) have been sent to the message recipients, the system will wait for a URL access request to be received from a message recipient (step 645). The URL access request will be generated by the message recipient accessing the message with the embedded URL. It should be noted that the "wait state" inherent in method 600 is important for dynamic messaging since the criteria used to determine the final message sent to a message recipient may change from the time the message with the unique URL is sent to the message recipient and the time message recipient accesses the message and requests access to the associated website.

In at least some preferred embodiments of the present invention, the "wait state" is a user configurable variable set for a specific period of time. If access to the website associated with the embedded URL in the message is not requested within the allotted time frame, a message originator or system level default action such as sending a reminder message to the message recipients or a notification to the system user may be triggered. If the unique URL is requested by the message recipient, web server 222 is configured to log any access information for each unique URL (step 650).

There are many formats that may be used for storing access and query information. Those skilled in the art will appreciate that the type and quantity of information gathered and stored depends upon the format web server 222 is configured to use. In most preferred embodiments, at least some of the information logged is related to the criteria used in creating the list of message recipients. In some preferred embodiments, the information logged is also related to a dynamic message for the message recipient. Some examples of the information that web server 222 may be configured to log include the chronological time of the URL access request, the GPS coordinates of the mobile communication device at the time the URL access request was received, or the type of web browser and operating system of the device making the request. The log information will typically be stored in database 223 and will be made available for access and reference by the message originator or sponsoring organization that generated the message to the message recipient.

Having a message recipient access a unique URL of their choosing is also an opportunity to accomplish more than merely gathering information about the device of the message recipient. After the URL is requested, web server 222 will reroute the web browser of the message recipient's mobile communication device to a specific web page (e.g., serve a web page to the web browser). Those skilled in the art understand how to reroute web browsers to different web pages based on the variable information gathered from the requesting web browser. This capability would allow for dynamic messages to be created and delivered to the message recipient based on the unique URL and associated dynamic web page message.

An example of the dynamic messaging function would be the use of the GPS coordinates to determine the distance of the message recipient from a given location, such as a school. Web server 222 can use this information to reroute the message recipient's web browser to any one of a series of web pages, where each of the web pages has a different message based on how close (or far away from) the user is to a given location. In this embodiment, the message recipient's location would be detected and the message recipient could be directed to the most appropriate web page based on that location. Another example of dynamic messaging is to use the time of the request for the unique URL to dynamically update the message at the unique URL to ensure that no "stale" or past due information is received by the message recipient when they access the unique URL.

In at least some preferred embodiments of the present invention, the message originator's organization may have deployed a mobile app suitable for use in conjunction with at least one mobile communication device. One skilled in the art would understand how to reroute web browsers to different web pages based on detecting the specific web browser and operating system information available when a mobile communication device requests access to a specific web page via a mobile communication device web browser. Some preferred embodiments of the present invention may utilize this capability to identify message recipients with mobile devices that are compatible with the version(s) of the mobile app (step 655). In these cases, one or more messages or incentives may be offered to the message recipient to encourage the message recipient to download and use the mobile app.

If the web browser accessing the web page is identified as a desktop computer operating system web browser (step 655="NO"), the web server may be configured to direct the browser to a desktop version of a web site (step 680). If the web browser accessing the web page is identified as a mobile device that is not compatible with the organization's mobile app (step 655="NO"), the web browser may be redirected to a mobile page of the organization's choice (e.g., a page discussing plans for future mobile apps on more platforms) (step 680).

If the mobile communication device and associated web browser requesting the web page is identified as being compatible with the organization's mobile app (step 655="YES") but the web page is not being accessed by the organization's designated mobile app (step 685="NO"), then the message recipient could be redirected to a web page that includes a download of the compatible mobile app (step 660). This would help induce an immediate action that the organization desires if they are trying to promote the use of their mobile app.

In some preferred embodiments of the present invention, a custom URL scheme is registered with an application. In other preferred embodiments of the present invention, a custom URL scheme may be used to direct a device to open an app when the URL is selected. For example, if the following URL scheme, "window location=ParentApp://", has been registered with the app, then a URL containing the URL scheme will launch the app named ParentApp when the URL has been selected. In some embodiments, a URL containing deep linking may be used to launch specific content within an app when the URL has been launched. If computer-based system 100 detects that the device does not open the named app even after the software instructions instruct the system to open the named app, then the device may redirects the browser to a website address, such as the website URL of the app store for downloading the app.

An example of code which instructs the device to perform this action is: setTimeout(function ( ) {window.location=https://itunes.apple.com/appdir. In some embodiments, when a user selects a URL and the system has determined which operating system is being used by the user's device or which type of device is the device, then system may use customized links or URLS such that a user on an Android device will be presented a URL from the computer-based system and the user can then be transported to an app download page for devices and operating systems which are appropriate for the user's device and operating system.

If the mobile communication device is compatible with the organization's mobile app (step 655="YES") and the mobile app is installed (step 685="YES") but the message recipient is not logged into the mobile app (step 690="NO"), then the message recipient may be sent a reminder (step 670) encouraging them to log into and use the mobile app.

In any case, for the most preferred embodiments of the present invention, the message recipient will eventually be directed to download and use the mobile app and then directed to the appropriate dynamic web page or message (step 680).

Many such organizational mobile apps utilize a user profile to personalize communication with individual message recipients. This typically requires the message recipients to authenticate themselves (e.g., login to access the mobile app) to use specific features of the mobile app along with other features that may be more generally available. In the most preferred embodiments, this login information may also be stored in database 223 and may be used to confirm that the message recipient should not receive any further reminders to download the mobile app (step 665="YES"). If a message recipient has downloaded the mobile app but is not logged into the mobile app when making a request to access a unique URL (step 665="NO"), the message recipient may be reminded to use the mobile app (step 670).

A message recipient's profile information may also be used to automatically change the message recipient's message preferences for optimized message delivery. Other preferred embodiments of the present invention may prompt the message recipient to make changes to their profile as necessary or desired. Regardless of the method for changing preferences, the most preferred embodiments of the present invention will also notify the message recipient that the mobile app will be their primary form of receiving messages once the mobile app has been downloaded and installed. The message recipient may elect to update their preferences or may need to download the mobile app again if they change mobile communication devices.

The various preferred embodiments of the present invention are designed to work for organizations with a group of message recipients that receive communications from the organization (message originator) where information about the message recipient (e.g., identity, organization relationship and status, mobile device preferences, etc.) can be used to optimize the message creation and delivery process. More specifically, the preferred embodiments of the present invention are readily adaptable to organizations such as a school or school district that desires to communicate with the teachers, parents, students, and staff more efficiently. The list of message recipient identifiers is based on either a narrow or broad criteria that is related to the information that the user wants to gather, or the type of dynamic message to be sent. For a school, the list would most likely include telephone numbers for both students and parents. The list of telephone numbers should be indicated to the system somehow, whether they are input directly into the system or are located in another accessible location that is which is in turn indicated to the system using a user interface.

Referring now to FIG. 7, a series of message recipient and mobile device profiles 700 are depicted. As shown in FIG. 7, the preferred embodiments of the present invention will comprise one or more mobile device profiles for each potential message recipient. Message recipients will register each mobile device for purposes of receiving messages. The message recipient and mobile devices profiles can be stored as database records in database 223 of FIG. 2 with each message recipient having a unique message recipient profile that contains the mobile device profile(s) for that message recipient. The message recipient profiles and mobile device profiles may be created manually or created automatically using one or more of the methods described herein.

Each mobile device may be identified by type, including hardware and software parameters. This will assist the message sender and ensure that messages are sent to message recipients via an appropriate messaging platform. The preferred order of selection for each message recipient can also be established by a configurable hierarchy of devices. Additionally, each mobile device profile can be enabled or disabled, depending on message recipient or message sender preferences. For example, some message recipients may not have a texting package with their cell phone plan and the cost of receiving a text message may be prohibitive. In that case, the message recipient can disable or configure the cell phone device profile to eliminate SMS messages as a potential option. Similarly, if an organization wants to prioritize text messages over phone calls, the device profiles for constituent message recipients can be configured appropriately.

Further, in addition to these device profile priorities and preferences, other message delivery options may be established (e.g., delivery preferences for message delivery to one mobile device or another based on time of day, day of week, message content, message originator identity, etc.). This will enhance the probability of messages being delivered in the most timely and appropriate fashion for each user.

Additionally, in the case of a single mobile device registered to multiple message recipients (e.g. a single mobile device is registered to multiple message recipients) then a conflict priority order may be assigned to the appropriate message recipient profile and the settings for the highest priority message recipient may override the settings for the lower priority message recipient registered as using the same mobile device.

Figure 8:
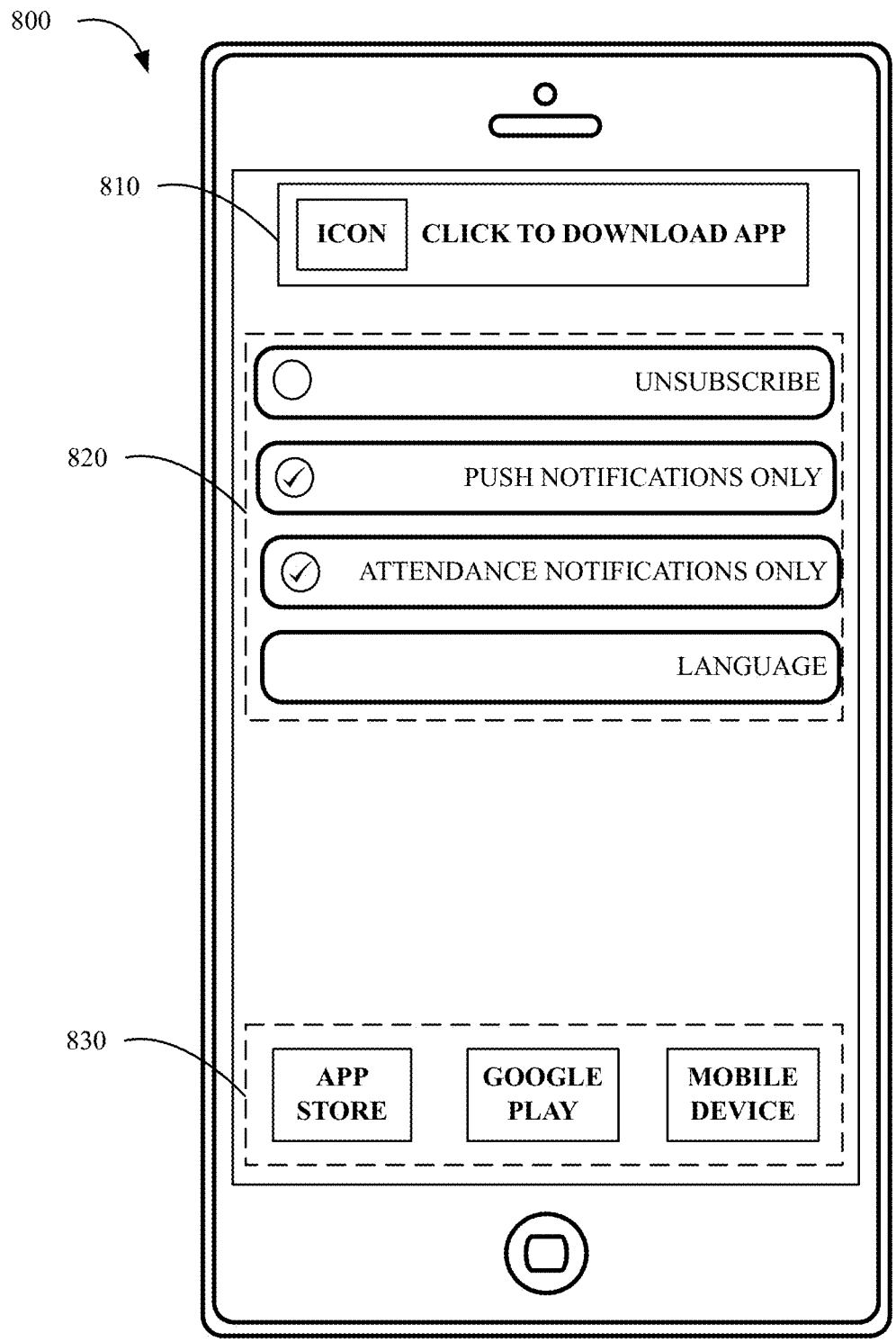
FIG. 8 is schematic representation of a mobile communication device mobile app interface for communicating with a message recipient via the system in accordance with a preferred exemplary embodiment of the present invention.

Referring now to FIG. 8, a schematic representation of a mobile communication device mobile app interface 800 for communicating with a message recipient via the system in accordance with a preferred exemplary embodiment of the present invention is depicted. As shown in FIG. 8, interface 800 includes a dynamic header 810, configuration options 820, and mobile app download share links 830.

After a message recipient receives a unique URL (via SMS, email, etc.) and clicks on the unique URL, the system will query the mobile communication device being used to request access to the URL and gather as much relevant information as possible. Additionally, by cross-referencing the unique URL to the database, the system can identify the message recipient or mobile communication device that is associated with the unique URL in the database. The URL can be any website that the system has been configured to deliver in response to the request received from the mobile communication device, including a website with dynamic messaging capability.

In the case of a mobile communication device (software and hardware) that is compatible with the message originator's designated mobile app, the custom webpage for the unique URL can be displayed in conjunction with user interface 800. In this case, dynamic header 810 comprises a link that will forward the message recipient to another Internet location where the version of the message originator's mobile app that is compatible with the message recipient's mobile communication device may be downloaded. In some preferred embodiments of the present invention, notifications regarding the deletion of the mobile app from the mobile communication device may be sent to the author when the app is deleted. In other situations, where notification is not received, a time sensitive server-side algorithm may be implement to send the message recipient an SMS message, push notification, or email, reminding them to use the mobile app. If messaging mechanism 225 of FIG. 2 sends a push notification to a mobile communication device 190 where the app had been deleted, a notification that the app has been deleted may be returned to messaging mechanism 225 via a notification service operated by the operating system associated with mobile communication device 190.

In some embodiments, once the message recipient has downloaded the appropriate version of the message originator's mobile app, and logged into their profile, the system will automatically change the message recipient's settings including, but not limited to, message type, method of notification, etc. This automatic change can be configured by the message originator. In addition, the message recipient will have the option to configure various message preferences or options 820 themselves at the custom webpage (e.g., the type of message to be received, method of notification, preferred language, etc.). Finally, the message recipient may also "share" the mobile app with other message recipients by clicking on one or more of the download share links 830.

Depending on the capabilities of the message recipient's mobile device, should a message recipient decide to delete the message originator's mobile application or mobile "app," a notification may be sent to computer-based system 100 that, in turn, updates the database to show that the specified message recipient no longer has the mobile application installed on their mobile device. Those skilled in the art will appreciate that the information regarding the current installation status of a mobile application on a message recipient's mobile device can be used for various purposes, including, but not limited to, updating the message recipient's profile in the database to show the message recipient no longer has the mobile application installed.

In some cases, a message recipient might manually alter the notification settings for the message originator's application on their mobile device. In this case, according to the capacities of the message recipient's mobile device, a notification is sent to the system that in turn updates the database to show that the specified message recipient no longer can receive notifications through the mobile application on their mobile device. Those skilled in the art will appreciate that the information regarding the current notification settings of a mobile application on a message recipient's mobile device can be used for various purposes, including, but not limited to, updating the message recipient's profile in the database to show the message recipient no longer can receive notifications through the mobile application.

By incorporating into a personalized URL a device identifier, such as the "phone number" for sending an SMS text message to a message recipient's device, or a message recipient ID identifier that is an identifier that represents a message recipient's account, messaging mechanism 225 can generate a personalized mobile website for that message recipient. In some embodiments the personalized mobile website allows the individuals to change their device settings without logging into the system. When a user selects the personalized URL, messaging mechanism 225 is notified that a user has selected the URL, the system then extracts the information about the user from the URL such as the SMS text message number for the user or the message recipient ID identifier.

Using the information contained in the custom URL, messaging mechanism 225 may create a customized mobile website page for that specific message recipient at the URL. For example, if the URL contains information about the message recipient's SMS text message number, then messaging mechanism 225 can determine which message recipient in database 223 is associated with that SMS text message number and messaging mechanism 225 can then present a customized mobile website page to the message recipient so that the message recipient can change the delivery preference settings for that SMS text message number or even the delivery settings for more than one of the message recipient's mobile devices such as the settings for messaging mechanism 225 to send email messages or phone messages to the message recipient. In some of the most preferred embodiments, the message recipient ID number which has been included in URL is used by messaging mechanism 225 to create a customized mobile website page for the message recipient.

In at least some preferred embodiments of the present invention, a URL shortening mechanism may be employed by messaging mechanism 225 when sending an SMS message to a message recipient. The URL shortening mechanism is employed to ensure that the custom link and any associated messaging can be successfully transmitted while adhering to the message length limitations associated with most SMS messaging protocols.

Several different options may be developed to allow message recipients to change their messaging preferences. In one case, messaging mechanism 225 will send the message recipient an SMS message saying something like, "To change preferences, click the link." Upon clicking the link, a user interface is displayed to the message recipient and the messaging preferences may be updated as desired. A custom web page will also be created allowing the message recipient to update their SMS preferences. A sample user interface for this application is shown in FIG. 9 below.

Figure 9:
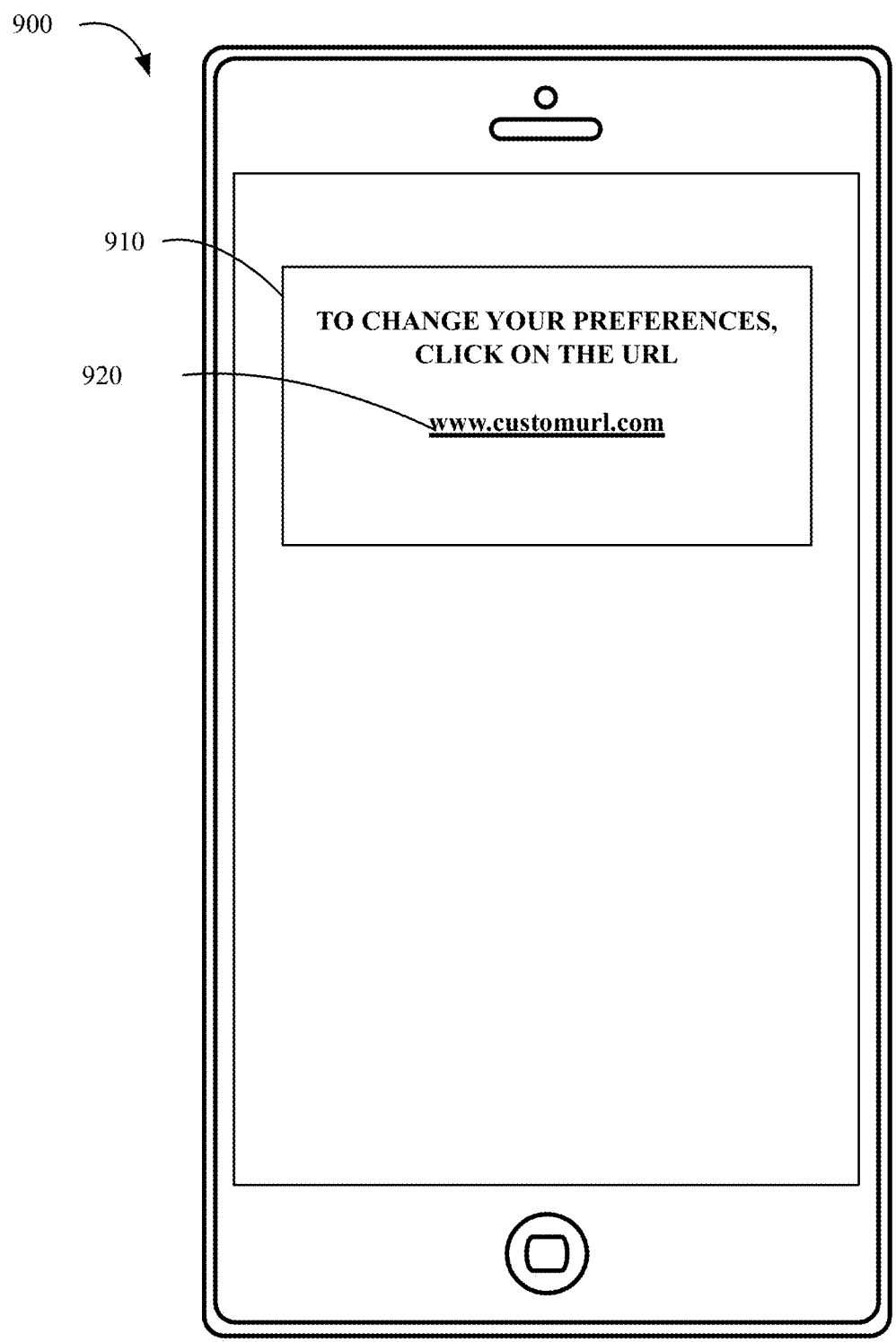
FIG. 9 is a schematic representation of a user interface of a sample message containing a custom URL that links a message recipient to the user interface described in FIG. 8 and FIG. 10 in accordance with a preferred exemplary embodiment of the present invention.

Referring now to FIG. 9, a schematic representation of a user interface 900 of a sample message containing a custom URL that links a message recipient to a user interface in accordance with a preferred exemplary embodiment of the present invention is depicted. As shown in FIG. 9, a message recipient may receive an SMS message 910 prompting the message recipient to alter their messaging preferences. SMS message 910 will contain a custom URL 920, derived by one of the methods described herein that will allow the message originator to access and modify their messaging preferences as desired.

Similarly, in at least some preferred embodiments of the present invention, the mobile app may be configured to access a custom web page that displays the message recipient's messaging preferences, along with the option to update or modify the messaging preferences. The messaging preferences may include, but are not limited to, telephone, email, and SMS preferences. The updated information may be stored in database 223. Several sample user interfaces for updating messaging preferences are shown in FIG. 10 and FIG. 11 below.

Figure 10:
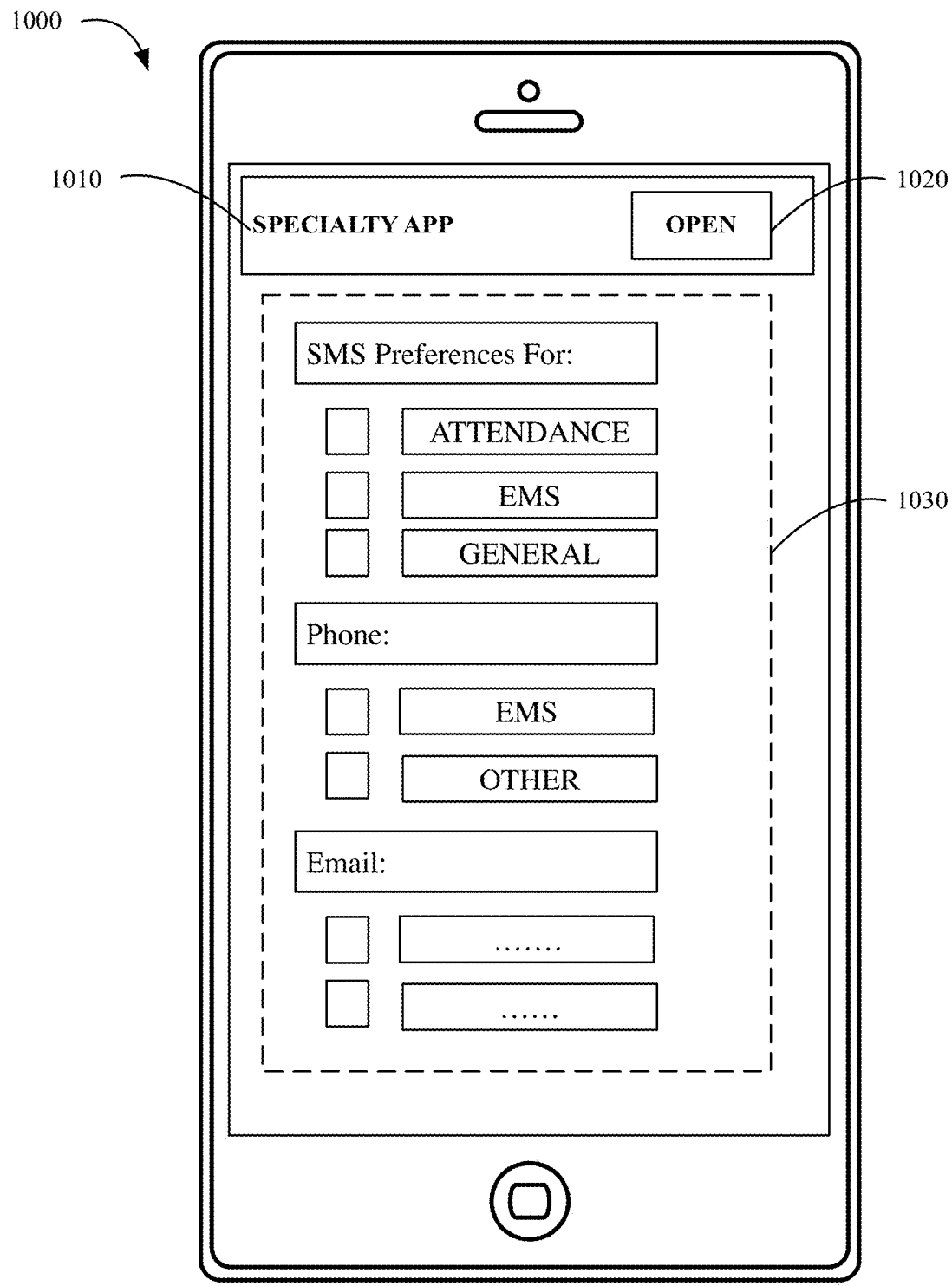
FIG. 10 is a schematic representation of a user interface for modifying user preferences using a mobile communication device in accordance with an alternative preferred exemplary embodiment of the present invention.

Referring now to FIG. 10, a schematic representation of a user interface 1000 for modifying user preferences using a mobile communication device in accordance with an alternative preferred exemplary embodiment of the present invention is depicted. A header 1010 identifies the mobile app and, if appropriate, the sponsoring organization that provides the mobile app for its constituents. The message recipient can then open the mobile app by clicking on an icon 1020 or access and modify or update their messaging preferences 1030.

Figure 11:
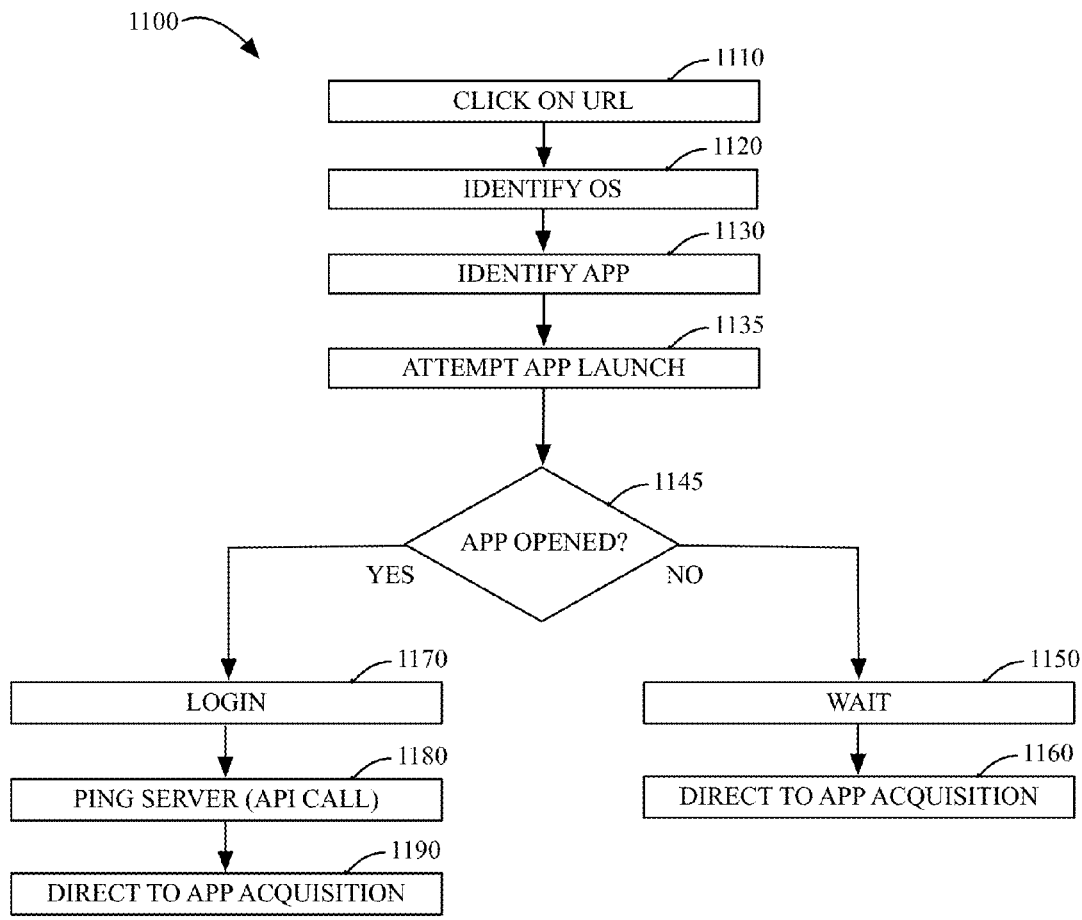
FIG. 11 is a flow chart of a method for using a custom URL for interacting with a message recipient in accordance with a preferred exemplary embodiment of the present invention.

Referring now to FIG. 11, a flow chart of a method 1100 for using a custom URL for interacting with a message recipient in accordance with a preferred exemplary embodiment of the present invention is depicted. As shown in FIG. 11, a message recipient can click on a custom URL (step 1110) that is presented to the message recipient's mobile communication device via email, SMS, or other method. Once the URL has been activated, the mobile communication device will send a response to messaging mechanism 225 of FIG. 2 and the operating system ("OS") for the mobile communication device can be identified (step 1120).

Next, since the custom URL has some type of identifier included in the custom URL, the identity of the message recipient associated with the mobile communication device can be ascertained by referencing database 223 of FIG. 2. With the identity of the message recipient confirmed, the appropriate mobile app associated with the message recipient can also be identified (step 1130) and the messaging mechanism 225 can attempt to launch or access the mobile app (step 1135).

If the mobile app is launched and opened, the appropriate signal from the mobile app will be transmitted to messaging mechanism 225 (step 1145="YES"). If the application opens there are may be three options to determine which message recipient has installed the app: the message recipient logs in (step 1170), thereby providing the authentication credential necessary for identification; the mobile app may be configured to ping the server or generate an API call (step 1180) when the message recipient opens the mobile app to notify messaging mechanism 225 that the mobile app has been opened; or a custom URL may be present in the mobile application and when the message recipient clicks on the custom URL the encrypted ID is matched with the message recipient ID contained in database 223 (step 1190).

Alternatively if the application does not open (step 1145="NO"), there will be a pre-determined waiting period (step 1150), (e.g., ~300 ms) and which may be user configurable, and then the message recipient may be redirected to an appropriate location where the message recipient can download the mobile app to their mobile communication device (step 1160). In addition to providing a method for acquiring the appropriate mobile app for their mobile communication device, additional enhancements may be configured in the process.

For example, for a school district, a custom webpage may be configured to direct message recipients associated with specific school districts to specific mobile apps that have been optimized for that school district. The organizational ID associated with a given message recipient may be extracted from database 223 and used to match the message recipient with the specific mobile app or apps they need to download. If a message recipient "John" is identified as being associated with the Alpine School District, dynamic header 810 of FIG. 8 would be configured to contain a link to the web page for downloading the Alpine School District's mobile app.

In other words, method 1100 of FIG. 11 provides for multiple scenarios with the most desirable situation being to launch the mobile app on the mobile device, if the mobile app has previously been installed, but if the mobile app has not been installed, then it easy for the message recipient to locate the correct location to install the mobile app that is compatible with the OS on their mobile communication device. If the custom URL has successfully launched the mobile app, then the mobile device would have redirected away from the browser and the mobile browser will not redirect to the app acquisition location after the waiting period.

As is known to those skilled in the art, many mobile device apps support custom URL protocols or schemes that can be used to receive messages from a message originator. Some mobile device apps use URL schemes to initiate specific requests. For example, a mobile communication app that wants to display an address in the maps app can use a URL to launch that app and then display the address. Messaging mechanism 225 may be configured to implement a custom URL schemes to facilitate similar types of communications in a variety of mobile apps.

Specifically, Apple® provides built-in support for a variety of URL schemes including http, mailto, tel, and SMS. Apple® also provides supports for http-based URLs targeted at specific mobile apps (e.g., Maps, YouTube®, and iPod®). The operating system handlers for these various URL schemes are built into the operating system and are not easily changed. Additionally, if a third party mobile device app includes a URL scheme that is identical to one defined by Apple; the Apple-provided app is launched instead of the third party mobile device app.

When a given URL scheme is not supported by the OS for a mobile communication device, the OS or specialized app (e.g., a mobile web browser installed on the mobile device) for the mobile device will generally warn the message recipient that the OS doesn't know what to do with the specified URL and the mobile web browser will typically remain on the same page. For these scenarios, a user configurable waiting period may be configured and then if the OS is not capable of processing the custom URL command, an alternative command may be issued in response.

In at least some preferred embodiments of the present invention, messaging mechanism 225 might be notified by the mobile app if the message recipient has modified their messaging preferences when the mobile app is launched. For example, some mobile operating systems will return a message to the message originator for changes that have been made to a user profile. In this case, messaging mechanism 225 may be configured to alter the messaging preferences for the message recipient and store the updated messaging preferences in database 223 of FIG. 2.

In order to promote security, the message recipient ID or device identifiers may be encrypted using an encryption algorithm, such as a one-way cryptographic hash, and an encryption mechanism (e.g., security mechanism 226 of FIG. 2). In some embodiments the mapping of the identifiers to the encrypted version identifier may be stored in database 223 of FIG. 2. In other embodiments, the encryption algorithm may be stored in the source code for the system but not in the database.

The encryption mechanism may use the encryption algorithm to generate the encrypted identifier but in some embodiments messaging mechanism 225 may not store the mapping of the identifiers to the encrypted version of the identifier in database 223. When messaging mechanism 225 receives a notification that a message recipient has clicked on a custom URL that contains an encrypted identifier, messaging mechanism 225 may then retrieve the encrypting algorithm (or directly use the encryption algorithm), the list of identifiers from the database, and then regenerate the encrypted identifiers by using the encryption algorithm. When messaging mechanism 225 has generated an encrypted identifier from a specific identifier that matches the encrypted identifier of the URL, then messaging mechanism 225 uses a matching algorithm to determine that the encrypted identifier represents the specific identifier.

It is important to note that when a message recipient selects or clicks on a custom URL containing the message recipient identification or other identifier, the message recipient may be directed to the servers associated with messaging mechanism 225. The servers may be configured to launch and display a web page associated with the custom URL where the web page instructs the device to launch the app.

The server then passes through the custom URL with the encrypted message recipient identifier (or unencrypted message recipient identifier), or directly passes through the encrypted message recipient identifier or an unencrypted message recipient identifier to the mobile app, and the mobile app has been configured so that it then makes an API call and passes that identifier to the servers; the servers then record in database 223 that the message recipient associated with the message recipient identifier has installed the mobile app and in some embodiments, system 100 then changes the user settings for that message recipient to increase the number of notifications that are sent to the app via push notifications and decreases, sometimes eliminating, the number of other types of notifications which are sent to that message recipient (e.g., SMS text messages).

As will be appreciated by one skilled in the art, various aspects of the computer-based system disclosed herein may be embodied as a system, method or computer program product. Accordingly, aspects of the computer-based system may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the computer-based system may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (e.g., non-transient storage medium). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the computer-based system may be written in any combination of one or more programming languages, including an object oriented programming language such as Objective-C, Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet service provider "ISP").

From the foregoing description, it should be appreciated that computer-based system 100 and the associated methods for optimizing mobile communications with one or more message recipients disclosed herein presents significant benefits that would be apparent to one skilled in the art. Furthermore, while multiple embodiments have been presented in the foregoing description, it should be appreciated that a vast number of variations in the embodiments exist. Lastly, it should be appreciated that these embodiments are preferred exemplary embodiments only and are not intended to limit the scope, applicability, or configuration of the invention in any way. Rather, the foregoing detailed description provides those skilled in the art with a convenient road map for implementing a preferred exemplary embodiment of the invention, it being understood that various changes may be made in the function and arrangement of elements described in the exemplary preferred embodiment without departing from the spirit and scope of the invention as set forth in the appended claims.

The invention claimed is:

1. An apparatus comprising:
   at least one processor;
   at least one memory coupled to the at least one processor;
   a database residing in the at least one memory;
   at least one message recipient profile residing in the at least one memory, the at least one message recipient profile being associated with a message recipient;
   a URL mechanism residing in the at least one memory, the URL mechanism being configured to:
      create a unique URL and associate the Unique URL with the message recipient;
      send a message containing the unique URL to a mobile communication device associated with the message recipient;
      capture a plurality of mobile communication device parameters when the unique URL is accessed by the message recipient;
      store the plurality of mobile communication device parameters in the at least one message recipient profile;
   a messaging mechanism, the messaging mechanism being configured to send a plurality of messages to a plurality of message recipients where each of the plurality of message recipients has a message recipient profile stored in the at least one database and where the content of at least some of the plurality of messages varies based on each message recipient profile and where a pre-determined time for delivery of the plurality of messages is determined by at least one of a message recipient preference and a message originator preference; and
   a message queue, the message queue being configured to store the plurality of messages and to send a reminder message to the message recipient the reminder message comprising a reminder to download an app that is compatible with the mobile communication device or to use to an app that is compatible with the mobile communication device.

2. The apparatus of claim 1 wherein the mobile communication device is one of a smart phone, a tablet, and a portable computer.

3. The apparatus of claim 1 wherein the URL mechanism is further configured to provide the message recipient with an opportunity to download an app that is compatible with the mobile communication device with compatibility being determined by the plurality of mobile communication device parameters when the unique URL is accessed by the message recipient.

4. The apparatus of claim 1 wherein the URL mechanism is further configured to select one of a plurality of communication platforms for sending messages to the message recipient based on the plurality of mobile communication device parameters captured when the unique URL was accessed by the message recipient.

5. The apparatus of claim 1 wherein the URL mechanism is further configured to send a message to the message recipient where the content of the message is determined by the plurality of mobile communication device parameters captured when the unique URL was accessed by the message recipient.

6. The apparatus of claim 1 wherein the URL mechanism is further configured to detect the presence or absence of a compatible app stored on the mobile communication device and send a message to the message recipient where the content of the message is determined by the absence or presence of the compatible app.

7. The apparatus of claim 1 further comprising a user interface, the user interface comprising a dynamic header, the dynamic header comprising a link to a website location where the message recipient can download an app that is compatible with the mobile communication device.

8. The apparatus of claim 1 wherein the at least one message recipient profile comprises a mobile device profile, the mobile device profile identifying:
   a software and hardware configuration for at least one mobile communication device;
   a message platform hierarchy specifying a preferred messaging platform; and
   an option to disable or enable the at least one communication device, thereby preventing the receipt of any messages by the at least one communication device.

9. A method comprising the steps of:
   creating a unique URL and associating the unique URL with a message recipient;
   sending a message containing the unique URL to a mobile communication device associated with the message recipient;
   capturing a plurality of mobile communication device parameters when the unique URL is accessed by the message recipient;
   storing the plurality of mobile communication device parameters in at a message recipient profile associated with the message recipient;
   configuring a messaging mechanism to send a plurality of messages to a plurality of message recipients where each of the plurality of message recipients has a message recipient profile stored in at least one database and where the content of at least some of the plurality of messages varies based on each message recipient profile and where a pre-determined time for delivery of the plurality of messages is determined by at least one of a message recipient preference and a message originator preference; and
   sending a reminder message to the message recipient, the reminder message comprising a reminder to download an app that is compatible with the mobile communication device or to use to an app that is compatible with the mobile communication device.

10. The method of claim 9 wherein the mobile communication device is one of a smart phone, a tablet, and a portable computer.

11. The method of claim 9 further comprising the step of providing the message recipient with an opportunity to download an app that is compatible with the mobile communication device with compatibility being determined by the plurality of mobile communication device parameters when the unique URL is accessed by the message recipient.

12. The method of claim 9 further comprising the step of selecting one of a plurality of communication platforms for sending messages to the message recipient based on the plurality of mobile communication device parameters captured when the unique URL was accessed by the message recipient.

13. The method of claim 9 further comprising the step of sending a message to the message recipient where the content of the message is determined by the plurality of mobile communication device parameters captured when the unique URL was accessed by the message recipient.

14. The method of claim 9 further comprising the step of detecting the presence or absence of a compatible app stored on the mobile communication device and send a message to the message recipient where the content of the message is determined by the absence or presence of the compatible app.

15. The method of claim 9 further comprising the step of accessing a dynamic header via a user interface, the dynamic header comprising a link to a website location where the message recipient can download an app that is compatible with the mobile communication device.

16. The method of claim 9 wherein the message recipient profile comprises a mobile device profile, the mobile device profile identifying:
- a software and hardware configuration for at least one mobile communication device;
- a message platform hierarchy specifying a preferred messaging platform; and
- an option to disable or enable the at least one communication device, thereby preventing the receipt of any messages by the at least one communication device.

* * * * *